US006983113B2

(12) United States Patent
Yamamoto et al.

(10) Patent No.: US 6,983,113 B2
(45) Date of Patent: Jan. 3, 2006

(54) RECYCLING METHOD USING A MODIFIED PART AND IMAGE FORMING APPARATUS MANUFACTURED USING THE RECYCLING METHOD

(75) Inventors: Yasuyoshi Yamamoto, Moriya (JP); Masahiro Funakoshi, Toride (JP); Masaaki Saito, Tokyo (JP); Ikuo Takeuchi, Toride (JP); Shinsuke Ubayashi, Kashiwa (JP); Takayuki Kato, Kashiwa (JP); Naoya Kikkawa, Toride (JP); Akihiro Shimizu, Kashiwa (JP); Hideaki Miyazawa, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 10/229,234

(22) Filed: Aug. 28, 2002

(65) Prior Publication Data

US 2003/0059229 A1  Mar. 27, 2003

(30) Foreign Application Priority Data

Aug. 31, 2001 (JP) ............................ 2001-264585
Sep. 11, 2001 (JP) ............................ 2001-274813
Dec. 25, 2001 (JP) ............................ 2001-390895

(51) Int. Cl.
 G03G 15/00 (2006.01)
(52) U.S. Cl. .................................................... 399/109

(58) Field of Classification Search ................ 399/109, 399/111, 107, 110, 113
See application file for complete search history.

(56) References Cited

U.S. PATENT DOCUMENTS

| 5,691,807 | A | | 11/1997 | Fuei et al. .................. 355/210 |
| 5,987,278 | A | * | 11/1999 | Nomura et al. ............. 399/109 |
| 6,240,605 | B1 | * | 6/2001 | Stevens et al. ............... 24/546 |
| 6,519,430 | B2 | * | 2/2003 | Higeta et al. ............... 399/109 |
| 6,574,445 | B2 | * | 6/2003 | Higeta et al. ............... 399/103 |
| 6,577,829 | B2 | * | 6/2003 | Higeta et al. ............... 399/109 |
| 6,621,996 | B1 | * | 9/2003 | Meyer et al. ............... 399/109 |
| 6,775,508 | B2 | * | 8/2004 | Macht et al. ............... 399/327 |
| 2003/0044198 | A1 | * | 3/2003 | Kato et al. .................. 399/109 |

FOREIGN PATENT DOCUMENTS

| CN | 1086024 | | 4/1994 |
| CN | 1125855 | | 7/1996 |
| EP | 0 485 271 | | 5/1992 |
| JP | 7-271131 | | 10/1995 |
| JP | 11-108020 | * | 4/1999 |
| JP | 2003-66666 | * | 3/2003 |
| JP | 2003-86962 | * | 3/2003 |

* cited by examiner

Primary Examiner—Quana Grainger
(74) Attorney, Agent, or Firm—Fitzpatrick, Cella, Harper & Scinto

(57) ABSTRACT

A recycling method in an apparatus having a part includes a part removal step of removing a part from the apparatus, and a mounting step of mounting to the apparatus a part having a specification different from that of the removed part.

16 Claims, 21 Drawing Sheets

RECYCLING METHOD USING A MODIFIED PART AND IMAGE FORMING APPARATUS MANUFACTURED USING THE RECYCLING METHOD

FIELD OF THE INVENTION AND RELATED ART

The present invention relates to a recycling method (remanufacturing method: REM or RMF), in which products used in the market place are recovered, disassembled, sorted, and reassembled to manufacture products virtually identical to the original, or products different from the original. In particular, it relates to an image forming apparatus recycling method.

It has been a common practice for manufacturers to recover their used products from the market place, due to environmental concerns. The recovered used products were disassembled, and sorted. The components which could be reused as they were, were reused. Some of those which could not be reused as they were, were used as the material for new products, or used as fuel, and the others were dumped after being reduced in volume by pulverization, burning, or the like.

In the past, however, the usage of the recycled products has been limited to the remanufacture of the products identical to the recovered products, or the products which are common in some components with the recovered products. In other words, the number of the recyclable products has been limited.

Further, recycling incurs the expense for recovery and disassembly, as well as the expense for determining whether or not the recovered used products are reusable. Thus, not all products have been recycled; some of them have been discarded.

Further, the amount of recyclable products has been limited. Therefore, the amount of recyclable products necessary to be recovered for recycling has fluctuated. In other words, as the amount of a shipment decreased, there was an excessive amount of the recovered recyclable products, whereas as the amount of a shipment increased, there was a shortage of the recovered recyclable products (in other words, shortage of recovered reusable components), forcing the manufacturers to use brand-new components for the remanufacture of the recyclable products. In other words, a fresh supply of recyclable components have been manufactured for the purpose of remanufacture. Further, as the products of the next generation come onto the market after the ending of the manufacture of the preceding generation resulting from the drop in the prices of the products of the preceding generation, the recovered recyclable products of the preceding generation and/or the components therefrom could not be used, ending up in the dump. In addition, the processes used for recycling the recyclable products of the preceding generation had to be modified for the recyclable products of the new generation. This generational switch resulted in additional waste products.

Some image forming apparatuses are made up of a plurality of functional units necessary for image formation, and a frame to which the plurality of functional units are attached. Therefore, as long as the units and/or components therefrom are reused for manufacturing such image forming apparatuses that are identical to the image forming apparatuses from which they were extracted, they were easy to recycle. However, the units and/or components therefrom were not easy to recycle when it came to the matter of reusing them to manufacture image forming apparatuses different in specification from the image forming apparatuses from which they were extracted, that is, image forming apparatuses different in their external shape, portions of the frame to which they are attached, combination in which they are assembled, and the like matters. Thus, in the latter case, the units and/or components which could not be reused had to be discarded, reducing the ratio at which the units and/or components from the recovered used image forming apparatuses were recycled.

SUMMARY OF THE INVENTION

The primary object of the present invention is to provide a recycling method which makes it possible for a recovered component to be reused not only for the remanufacture of an apparatus identical in specification to the product from which the component was extracted, but also for the manufacture of products different in specification from the product from which the component was extracted, and also, to provide an image forming apparatus which can be remanufactured or manufactured using such a recycling method.

According to one of the preferable embodiments of the present invention for accomplishing the above described object, a method for recycling an apparatus comprising a plurality of components comprises: a component removing process for removing certain components from a recovered apparatus; and a component attaching process for attaching components different in specification from those certain components removed from the recovered apparatus, to the recovered apparatuses from which the certain components were removed.

According to another preferable embodiment of the present invention, an image forming apparatus comprising a plurality of components is recyclable through the following processes: a component removing process for removing certain components from a recovered apparatus; and a component attaching process for attaching components different in specification from those certain components removed from the recovered apparatus, to the recovered apparatus from which those certain components were removed.

These and other objects, features, and advantages of the present invention will become more apparent upon consideration of the following description of the preferred embodiments of the present invention, taken in conjunction with the accompanying drawings.

DESCRIPTION OF THE PREFERRED EMBODIMENTS

Figure 1:
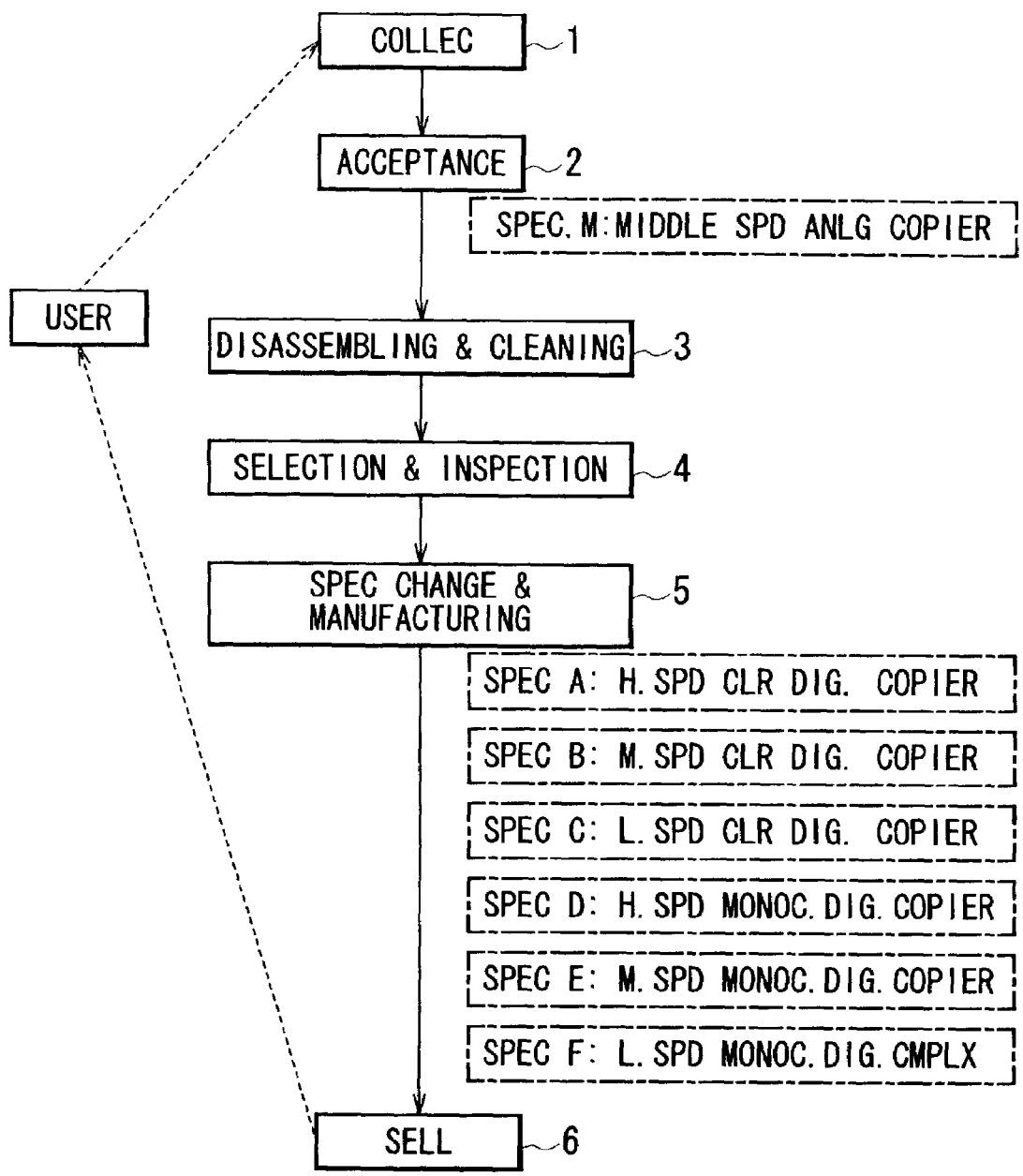
FIG. 1 is a chart for showing an image forming apparatus recycling process.

FIG. 1 is a chart for an image forming apparatus recycling method in accordance with the present invention. Designated by referential codes 1, 2, 3, 4, 5, and 6 are: a recovering process; a receiving process; a disassembling/cleaning process; a sorting/examining process; a specification modifying/manufacturing process; and a selling process, respectively.

The products recovered from users are processed in the receiving process 2; they are subjected to a simple examination to determine their specifications. For example, some of them are classified as an M type: black-and-white analog copying machine.

After being classified as the M type, they are transferred to the disassembling/cleansing process 3, in which they are disassembled into frames, units, components, and the like, and are cleansed.

In the sorting/examining process 4, the frames, units, components, and the like, disassembled from the recovered apparatuses are checked for defects, and then, are sorted. Those with problems are repaired for reuse.

Then, those restored to the state in which they can be reused, are sent to the specification modifying/manufacturing process 5.

In the specification modifying/manufacturing process 5, their specifications are modified to specifications different from the specifications which belonged to them when they were attached to the original apparatuses. For example, the new specifications are: specification A: high speed digital color copying machine; specification B: medium speed digital color copying machine; specification C: low speed digital color copying machine; specification D: high speed digital black-and-white copying machine; specification E: medium speed digital black-and-white copying machine; specification F: low speed digital black-and-white copying machine; and the like.

Incidentally, specification modification adds to the cost of some of the aforementioned processes. Thus, the specifications may be modified to increase the values of the apparatuses of the next generation, so that the profitability can be secured by the value added by the specification modification made in these processes, in spite of the cost increases incurred by the specification modification.

The modifying/manufacturing process 5 prevents the usage of the recovered components from being limited to the remanufacturing of products identical to the products from which the components were recovered. In other words, the modifying/manufacturing process 5 makes it possible for the recovered components to be used for apparatuses other than the apparatuses from which they were extracted. Thus, even if the amount by which one of the various models of apparatuses is manufactured fluctuates, the frames, units, components, and the like from the recycled apparatuses of this model can be used for the manufacturing of the other models, stabilizing the recycling operation.

Also, with the provision of the modifying/manufacturing process 5, even after the apparatuses of the new generation take over the markets toward the end of the life cycle of the apparatuses of the preceding generation, those recovered from the apparatuses of the preceding generation can be used for the manufacturing of the new generation, extending the service lives of the components from recyclable apparatuses.

Further, the provision of the process 5 makes it unnecessary for the other processes in the recycling method to be modified, eliminating the waste traceable to product cycle.

The products manufactured through the specification modifying/manufacturing process are sold to users (selling process 6).

Figure 2:
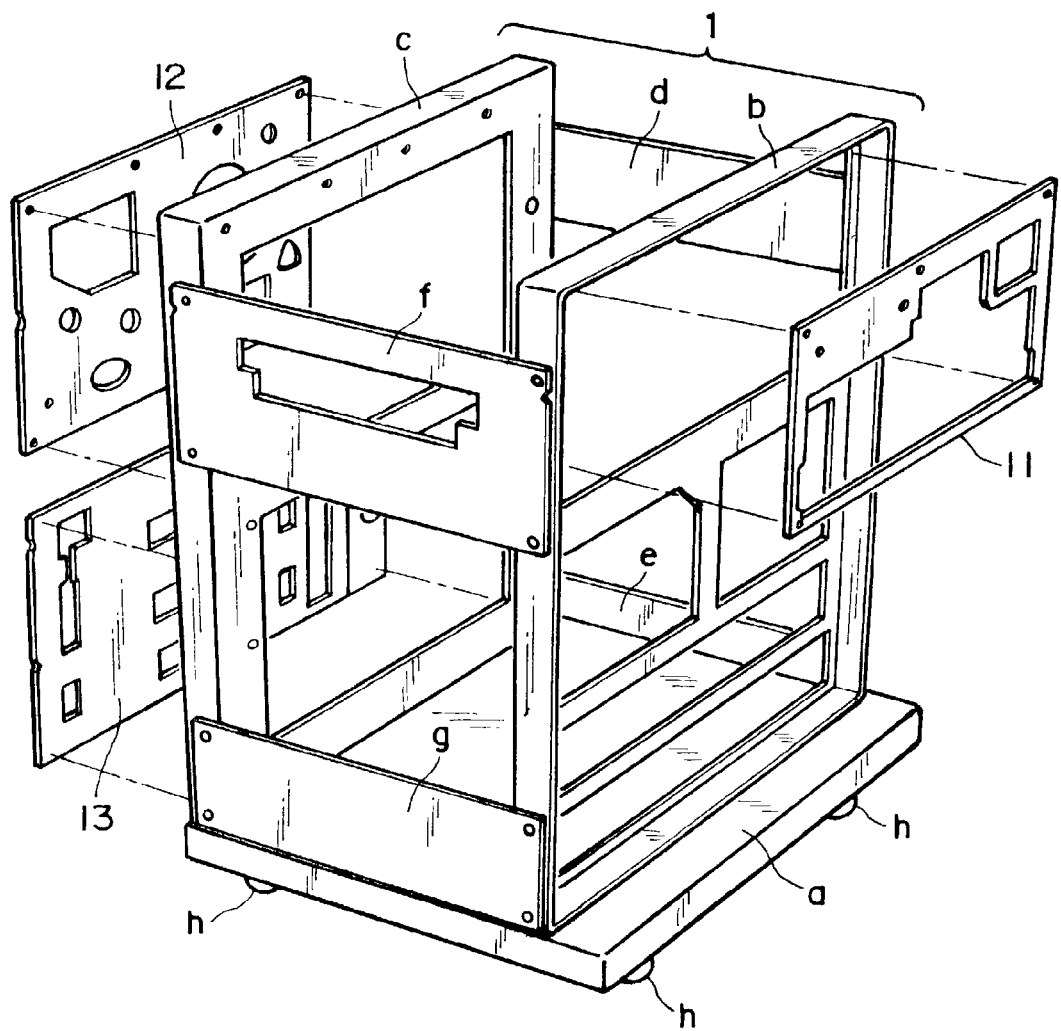
FIG. 2 is a drawing for showing Example 1 of a specification modifying/manufacturing process.
Figure 3:
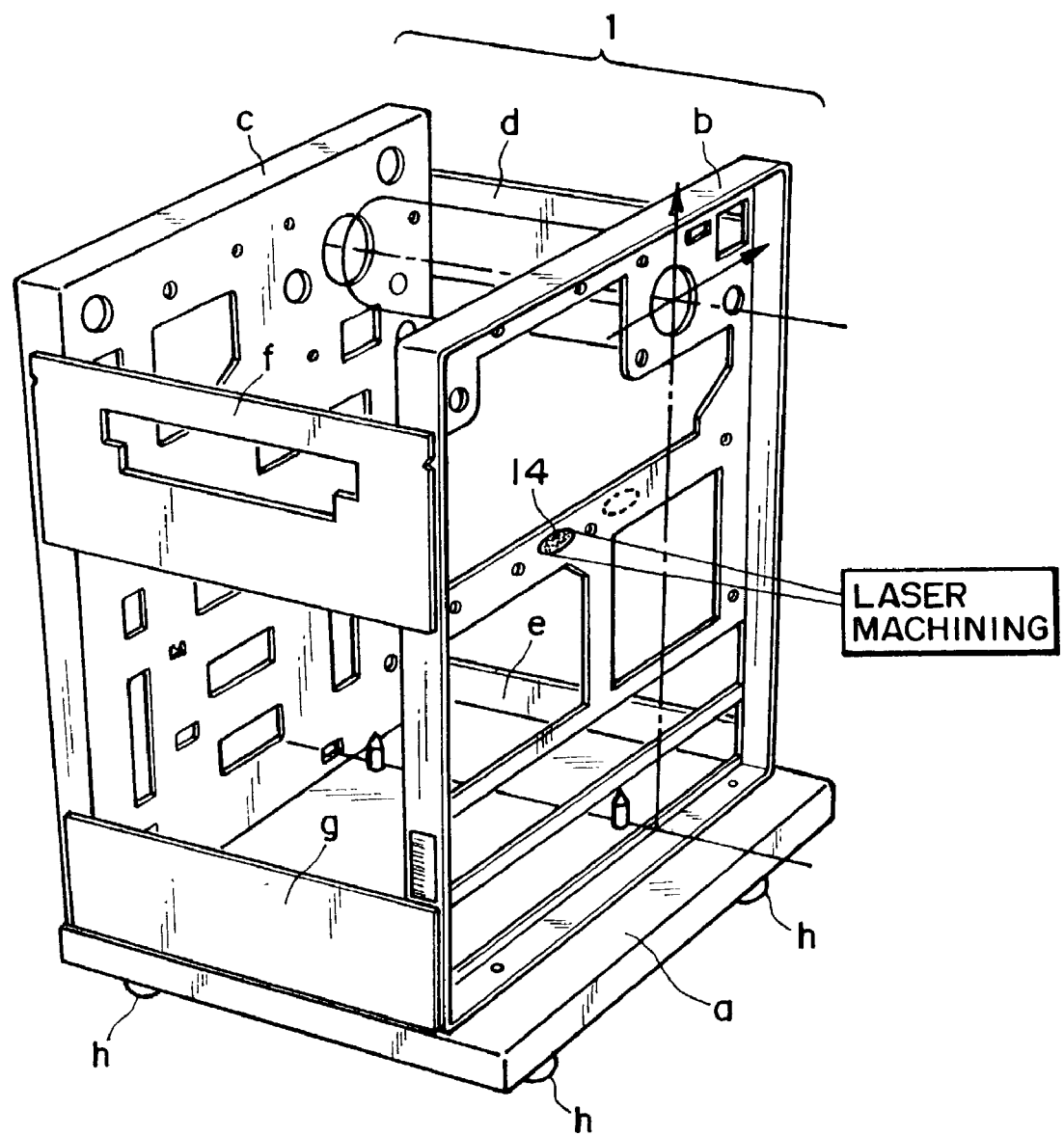
FIG. 3 is a drawing for showing Example 2 of a specification modifying/manufacturing process.
Figure 4:
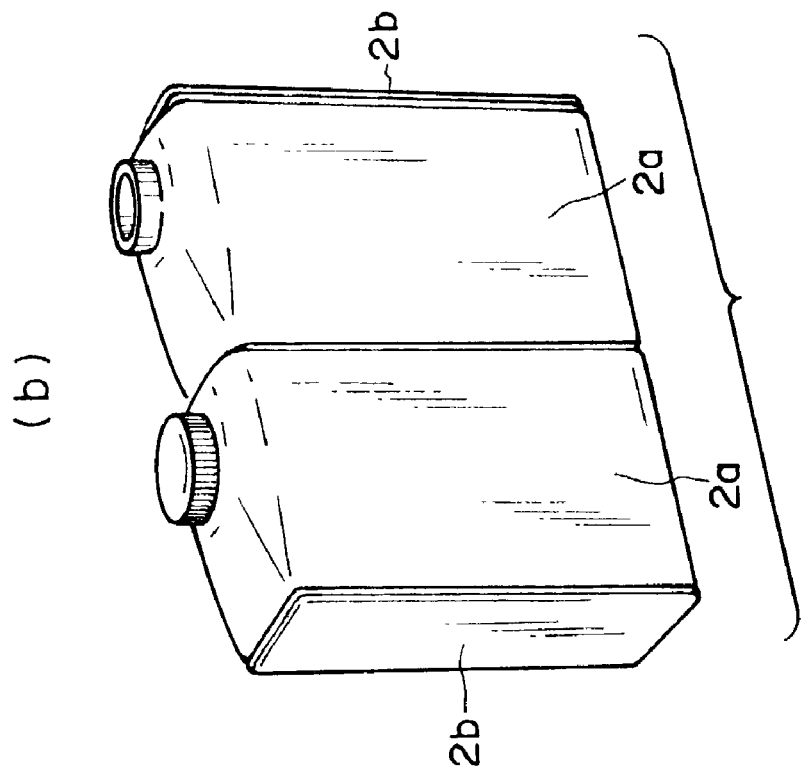
FIG. 4 is a drawing for showing Example 3 of a specification modifying/manufacturing process.
Figure 4:
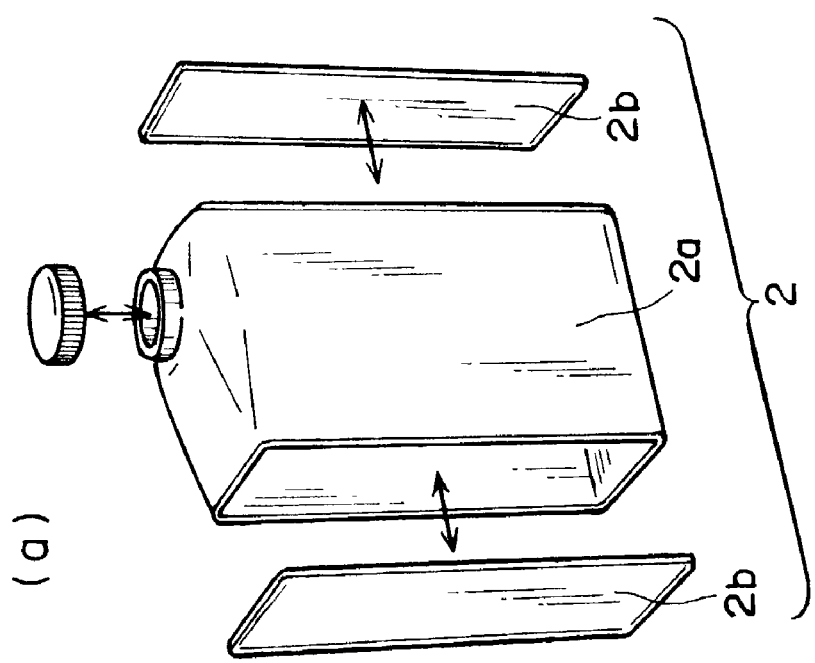

FIGS. 2–4 show examples of the specification modifying/manufacturing process.

Example 1 of Specification Modifying/Manufacturing Process (FIG. 2)

In this example, a recovered image forming apparatus is disassembled, and the components therefrom are sorted. Then, the original front, back, and side plates are removed from the frame 1, and front, back, and side plates 11, 12, and 13 different in specification from the original plates removed from the frame 1 are attached to the frame 1 to make the frame 1 reusable.

Referring to FIG. 2, designated by referential codes a, b, and c are: bottom plate, front plate, and back plate, of the frame 1. Designated by referential codes d and e are top right stay and bottom right stay, to which the front and rear plates b and c are solidly fixed, whereas designated by referential codes f and g are top left stay and bottom left stay, to which the front and back plates b and c are solidly fixed. Designated by a referential code h is a caster attached to the bottom plate a of the frame 1.

The recovered frame is modified in specification so that after the modification, the recovered frame matches the specification of an image forming apparatus of the next generation, that is, the generation after the generation to which the image forming apparatus from which the frame was removed belongs. After the modification, the recovered frame is reused for manufacture of an image forming apparatus of the next generation. Sometimes, the recovered frame is modified in specification so that after the modification, the recovered frame matches the specification of a modified version of an image forming apparatus of the same generation. After the modification, the recovered frame is reused for the manufacture of a modified version of an image forming apparatus of the same generation.

The component anchoring portion of the recovered frame 1, to which a recovered and modified component, or a brand-new component, is attached, may be the same as the component anchoring portion of the recovered frame 1, from which the original component was removed, or the frame 1 may be provided in advance with a plurality of component anchoring portions, to which a component, which is the same in function but is different in specification, can be attached, so that the recovered and modified component, or a brand-new component, which is substantially the same in function as the original component but is different in specification, can be readily attached to the recovered frame to manufacture a product different in specification from the product from which the frame 1 was extracted. Further, a product may be designed so that the modified version of a given original component of the product, or a brand new component which replaces the given original component, can be readily attached to the component anchoring portion of the frame, from which the original component was removed, and that the component anchoring portion of the frame to which the given original component is attached is made different from the component anchoring portions to which the components other than the given component are attached.

Example 2 of Specification Modifying/Manufacturing Process (FIG. 3)

In this example, a recovered image forming apparatus is disassembled, and the components therefrom are sorted. Then, a portion 14 of the frame 1 is processed by a laser to make the frame 1 reusable. In other words, the recovered frame 1 is modified in specification by a laser in order to make the frame 1 reusable for the manufacture of a product different in specification from the product from which the frame 1 was removed.

That is, in order to make the frame 1 from a recovered image forming apparatus of the preceding generation meet the specification of an image forming apparatus of the next generation, the portion 14 of the frame 1 of the recovered image forming apparatus is processed so that the frame 1 from the recovered image forming apparatus of the preceding generation can be used for the manufacture of an image forming apparatus of the next generation, or in order to make the frame 1 of the recovered image forming apparatus of the current generation meet the specification of a modified version of an image forming apparatus of the current generation, the portion 14 of the frame is processed so that the frame 1 from the recovered image forming apparatus can be used for the manufacture of a modified version of an image forming apparatus of the current generation.

Example 3 of Specification Modifying/Manufacturing Process (FIG. 4)

In this example, in order to use a plurality of recovered components to produce a component different in specification from the plurality of components, the plurality of recovered components are combined in a manner different from the manner in which they were originally combined.

Referring to FIG. 4(*a*), the recovered waste toner container 2 can be cut into three pieces: main section 2*a*, left plate 2*b*, and right plate 2*b*. Next, referring to FIG. 4(*b*), a main section 2*a*, the right plate of which has been removed, and a main section 2*a*, the left plate of which has been removed, are connected (gluing or welding) by the edges of their openings created by the removal of their side plates, to produce a waste toner container 2A different in specification from an original waste toner container, that is, a waste toner container larger in capacity.

As described above, this example is a method for using a plurality of recovered components to produce a new component (2A) different in specification from any of the recovered components.

(Embodiment 1)

Figure 5:
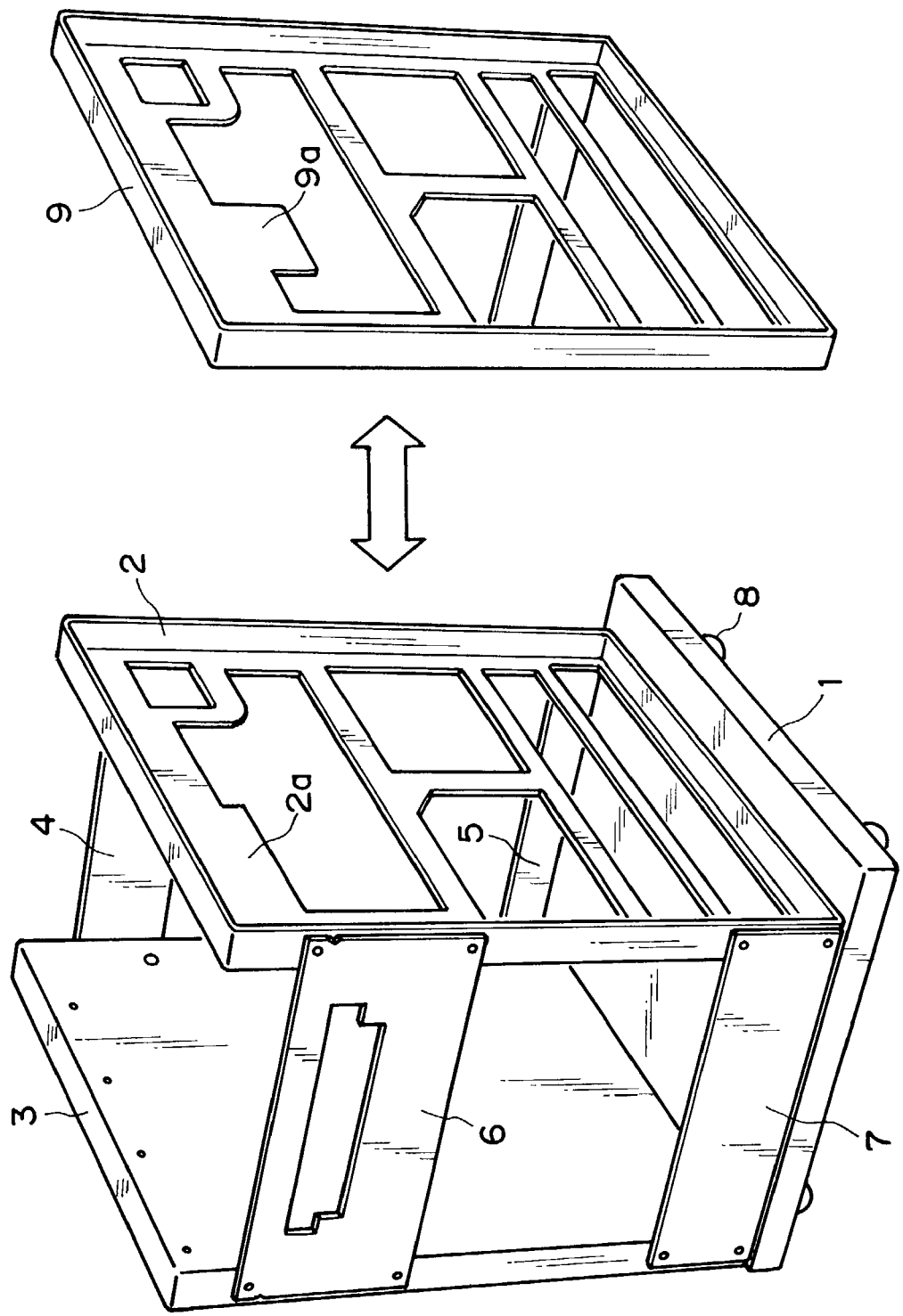
FIG. 5 is a drawing for showing the first embodiment of the present invention.

FIG. 5 is a drawing which best shows the characteristics of this embodiment. In the drawing, referential codes 1, 2, and 3 stand for the bottom, front, and rear plates of the main frame of an image forming apparatus or the like. Designated by referential codes 4 and 5 are the top right stay of the main frame, to which the front and rear plates 2 and 3 of the main frame are solidly attached, and the bottom right stay of the main frame, to which the front and rear plates of the main frame are solidly attached, respectively. Designated by referential codes 6 and 7 are the top left stay of the main frame, to which the front and rear plates 2 and 3 of the main frame are solidly attached, and the bottom left stay of the main frame, to which the front and rear plate 2 and 3 of the main frame are solidly attached, respectively. Designated by a referential code 8 is a caster attached to the bottom plate 1 of the main frame.

This embodiment is an example of a recycling method characterized in that in order to recycle the main frame of the recovered image forming apparatus, the original front plate 2 of the main frame is replaced with a front plate 9, which is partially different from the original front plate 2; the portion 9*a* of the replacement front plate 9 is different in configuration from the portion 2*a* of the original front plate 2.

In this embodiment, the present invention was described with reference to only the front plate 2 (9) of the main frame of an image forming apparatus. However, replacement does not need to be limited to the front plate 2 of the main frame. In other words, replacing a single or plurality of the structural components of the main frame other than the front plate 2, instead of, or as well as, the front plate 2, is not discordant with the gist of the present invention.

(Embodiment 2)

Figure 6:
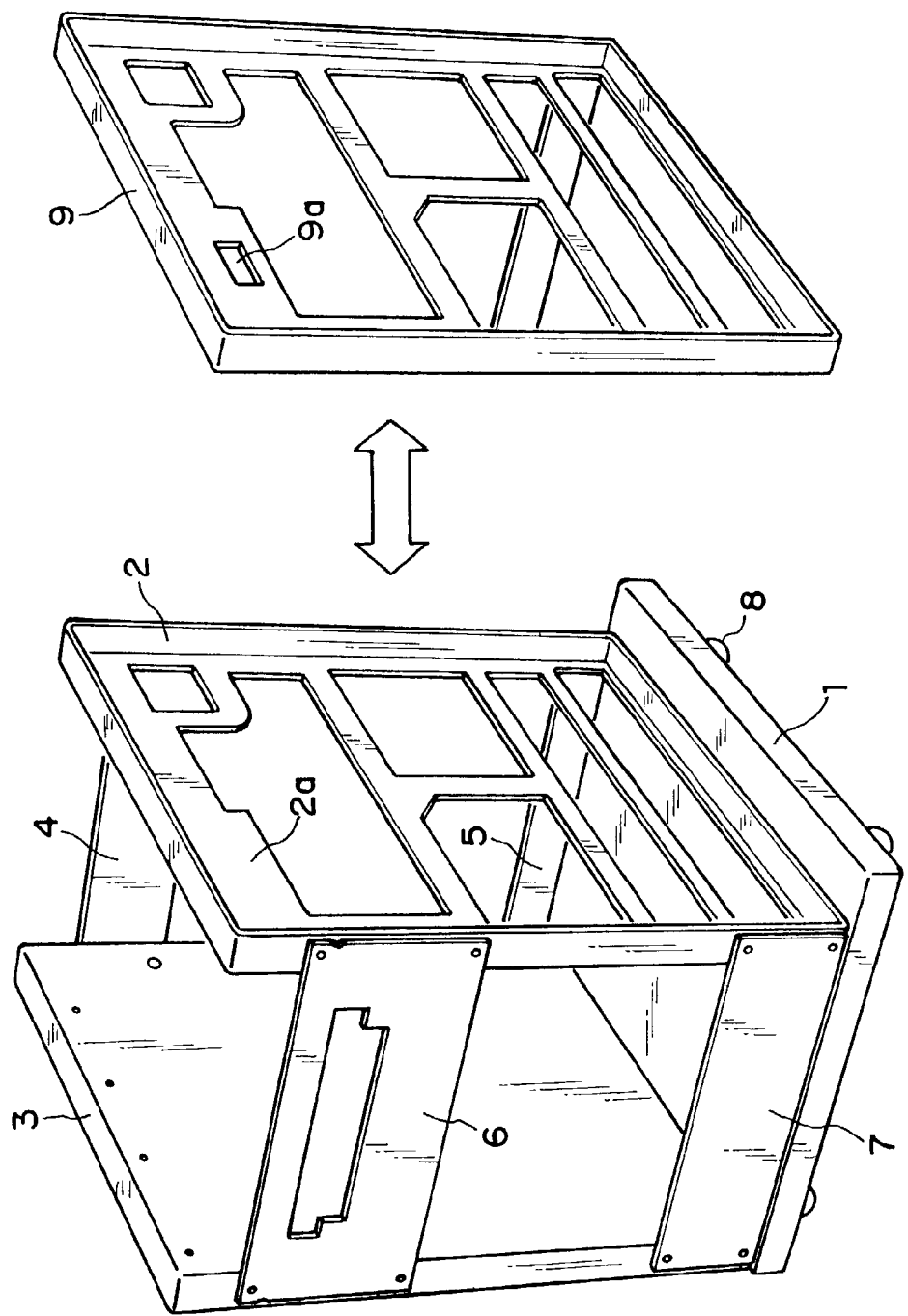
FIG. 6 is a drawing for showing the second embodiment of the present invention.

FIG. 6 is a drawing which best shows the characteristics of this embodiment. In the drawing, the structural components of the main frame similar to those in FIG. 5 are given the same referential codes as those given in FIG. 5 to avoid the repetition of the same descriptions.

This embodiment is an example of a recycling method characterized in that the front plate 2 of the main frame is partially modified. More specifically, for the purpose of recycling the main frame of the image forming apparatus, the front plate 2 of the main frame is processed to provide the portion 2a of the front plate 2 with a rectangular hole identical to the rectangular hole 9a of the front plate 9 shown in FIG. 6.

A referential code 2a stands for the portion of the front plate 2 before the front plate 2 is process for recycling, and the referential code 9a stands for the rectangular hole identical to the rectangular hole which will be cut through the portion 2a of the front plate 2. Although in this embodiment, only a single rectangular hole is cut through the portion 2a of the front plate 2, the number of the holes may be two or more, and the shape of the hole may be different from that of the shape of the hole cut in this embodiment. Further, the portion or portions of the main frame which are modified for recycling may be those other than the front plate 2. In other words, modifying a single or plurality of the portions of the main frame other than the portion 2a of the front plate 2 in this embodiment, instead of, or as well as, the portion 2a, is not discordant with the gist of the present invention.

(Embodiment 3)

Figure 7:
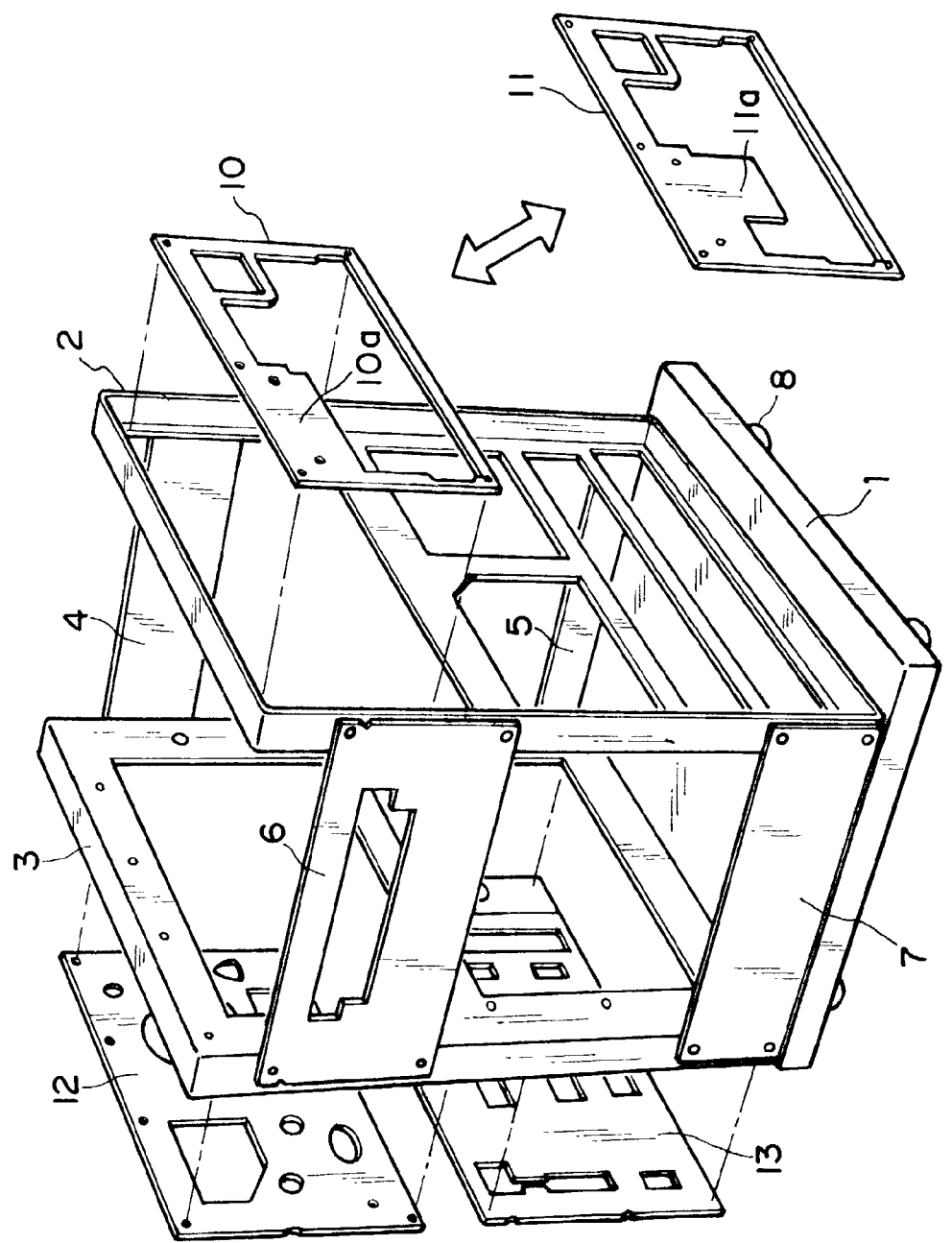
FIG. 7 is a drawing for showing the third embodiment of the present invention.

FIG. 7 is a drawing which best shows the characteristics of this embodiment. In the drawing, the structural components of the main frame similar to those in FIG. 5 are given the same referential codes as those given in FIG. 5 to avoid the repetition of the same descriptions.

A referential code 10 stands for a flat plate which constitutes a part of the front member 2 of the main frame. Referential codes 12 and 13 stand for a couple of flat plates which constitute the parts, one for one, of the rear member 13 of the main frame.

This embodiment is an example of a recycling method characterized in that in order to make the front plate 2 of the recovered main frame recyclable, the flat member 10, which constitutes a part of the front member 2 of the recovered main frame, is replaced with a flat plate 11 which is partly different in configuration from the flat member 10.

The portion 11a of the flat plate 11 which replaces the flat plate 10 constituting a part of the front member 2 is different in configuration from the portion 10a of the flat plate 10.

Although this embodiment of the present invention was described with reference to the front member 2 of the main frame, this embodiment is not intended to limit the application of the present invention to the front member 2 of the main frame. In other words, replacing a single, or plurality, of the members of the main frame other than the front member 2, instead of, or as well as, the front member 2, is not discordant with the gist of the present invention.

(Embodiment 4)

Figure 8:
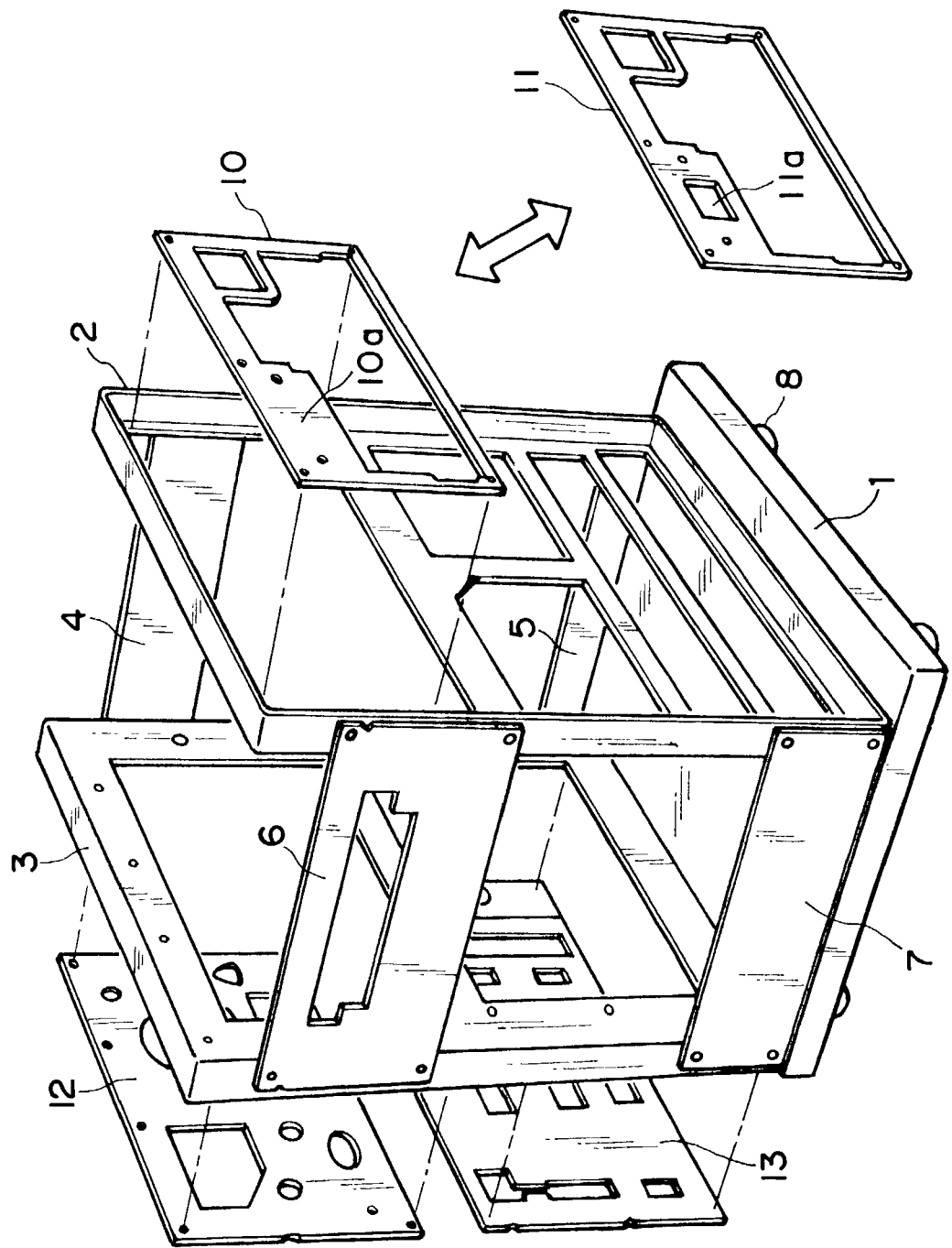
FIG. 8 is a drawing for showing the fourth embodiment of the present invention.

FIG. 8 is a drawing which best shows the characteristics of this embodiment. In the drawing, the structural components of the main frame similar to those in FIG. 7 are given the same referential codes as those given in FIG. 7 to avoid the repetition of the same descriptions.

This embodiment is an example of a recycling method characterized in that in order to recycle the front member 2 of the recycled main frame, the flat plate 10 constituting a part of the front member 2 is processed to provide it with a rectangular hole identical to the rectangular hole 11a of the flat member 11 shown in FIG. 8, partly modifying in configuration the flat plate 10 of the front member 2 of the main frame prior to recycling.

Designated by a referential code 10a is a portion of the flat plate 10 before it is processed, whereas designated by a referential code 11a is the hole similar to the hole given to the portion 10a of the flat plate 10 by the processing.

Although this embodiment was described with reference to the addition of the rectangular hole 10a, it was not intended to limit the scope of the present invention. In other words, the shape of the hole may be different from the shape given in this embodiment, and the number of the holes may be two or more. Further, the modification does not need to be limited to the front member 2. In other words, modifying the structural members of the main frame other than the front member 2, instead of, or as well as, the front member 2, is not discordant with the gist of the present invention.

(Embodiment 5)

Figure 9:
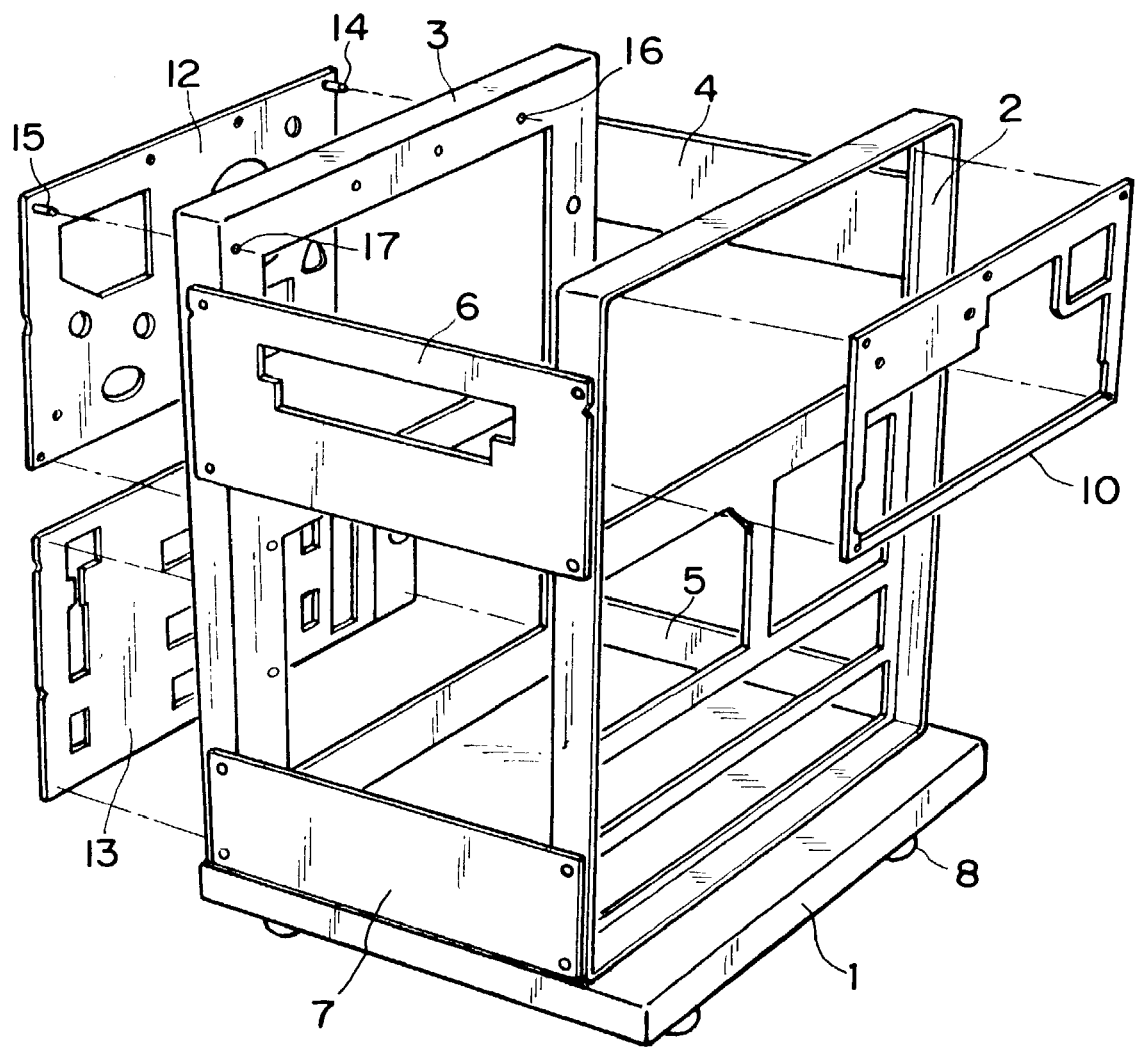
FIG. 9 is a drawing for showing the fifth embodiment of the present invention.

FIG. 9 is a drawing which best shows the characteristics of this embodiment. In the drawing, the structural components of the main frame similar to those in FIG. 7 are given the same referential codes as those given in FIG. 7 to avoid the repetition of the same descriptions.

Designated by referential codes 14 and 15 are positioning pins for positioning a flat plate 12, which constitutes the rear plate of the main frame, relative to the rear member 3 of the main frame, whereas designated by referential codes 16 and 17 are holes of the rear member 3 of the main frame, into which the positioning pins 14 and 15 are fitted one for one.

Placing the positioning pins 14 and 15 on the rear member 3 side is not discordant with the gist of the present invention.

(Embodiment 6)

Figure 10:
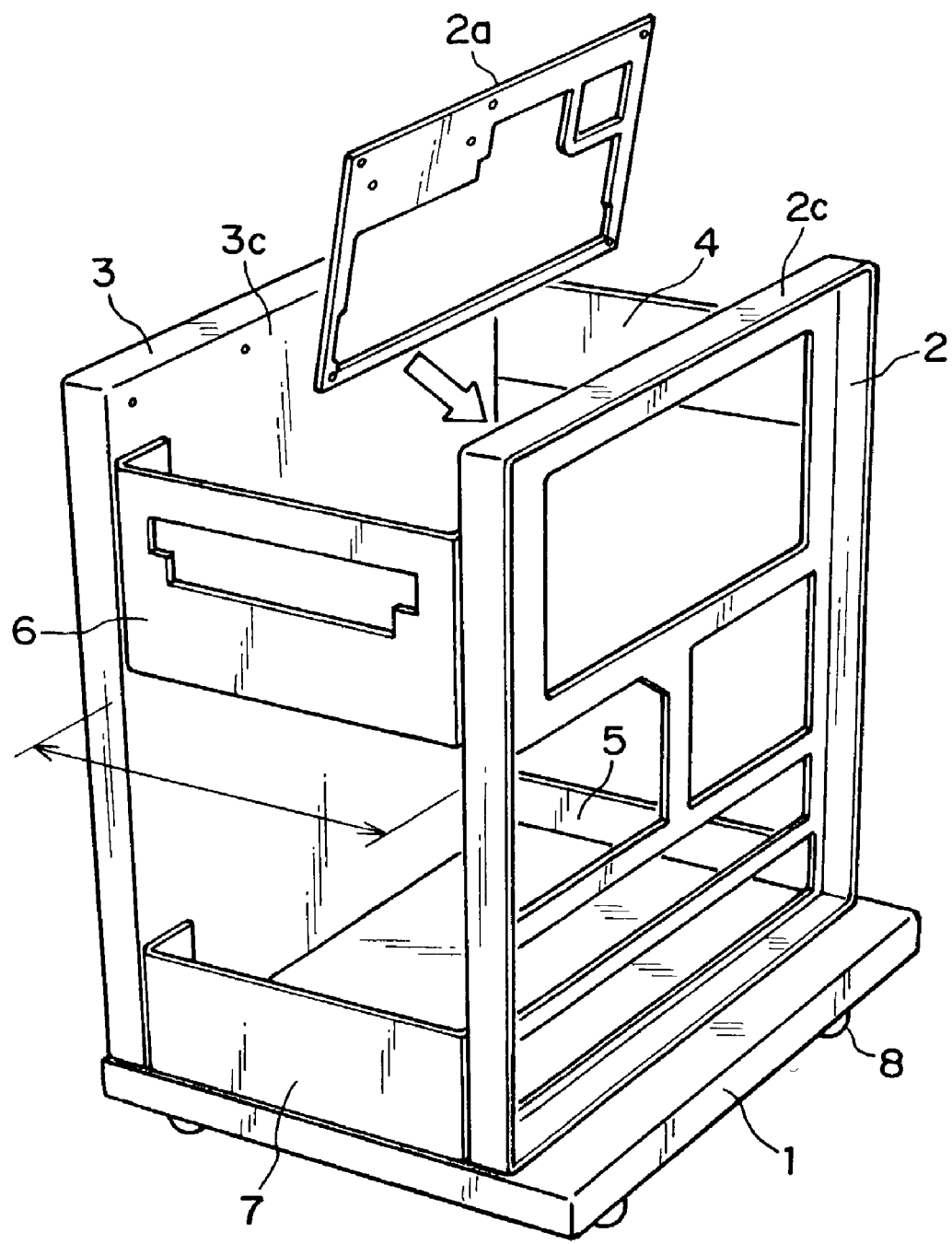
FIG. 10 is a drawing for showing the sixth embodiment of the present invention.

FIG. 10 is a drawing which best shows the characteristics of this embodiment. In the drawing, the structural components of the main frame similar to those in FIG. 5 are given the same referential codes as those given in FIG. 5 to avoid the repetition of the same descriptions.

In this embodiment, the distance L between the front and rear members 2 and 3 of the main frame is determined by the stays 4 and 7 of the main frame; the distance L becomes fixed as the lengthwise ends of stays 4 and 7 are placed in contact with the inward surface 2c of the front member 2 and the inward surface 3c of the rear member 3.

This embodiment is an example of a recycling method characterized in that in order to recycle the main frame of a recovered apparatus, the flat plate 2a constituting the front plate of the main frame is replaced with a flat plate which is partly different in configuration from the flat plate 2a, and further, the replacement plate is attached to the front member 2 from the inward surface 2c side of the front member 2, that is, the surface which contributes to the fixing of the distance L between the front and rear members 2 and 3.

With the provision of this structural arrangement, it is possible to improve the level of the accuracy with which the components attached to the front surface of the flat plate are positioned relative to the rear member of the main frame.

The flat plate 2a constituting the front plate of the front member of the main frame may be processed before, or after, its attachment to the front member 2 of the main frame, or it may be replaced with a component virtually identical in configuration to the processed flat plate 2a.

Although this embodiment is described with reference to the flat plate of the front member of the main frame, it is not intended to limit the scope of the present invention to the flat plate of the front member of the main frame. In other words, modifying the components of the main frame other than the flat plate of the front member of the main frame, instead of, or as well as, the flat plate of the front member of the main frame, and attaching them to the main frame from the side other than the side from which the original components were attached to the main frame, is not discordant with the gist of the present invention.

(Embodiment 7)

Figure 11:
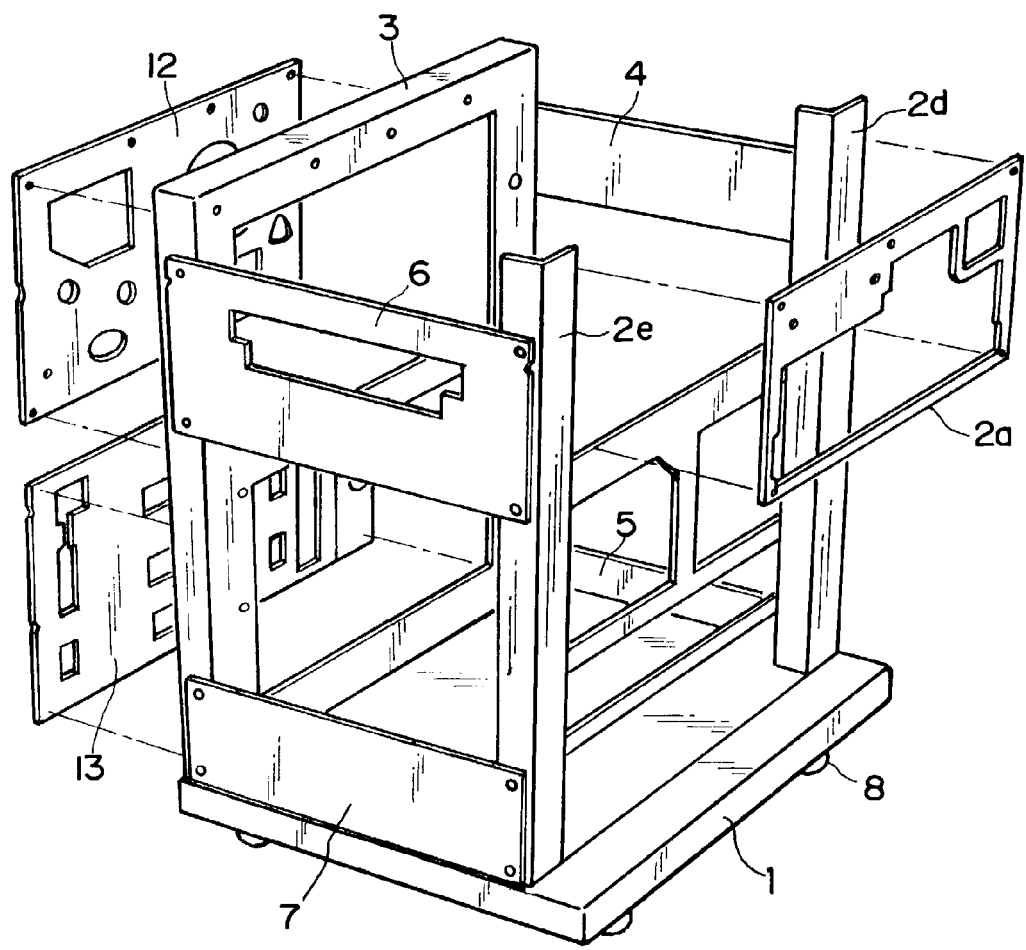
FIG. 11 is a drawing for showing the seventh embodiment of the present invention.

FIG. 11 is a drawing which best shows the characteristics of this embodiment. In the drawing, the structural components of the main frame similar to those in FIG. 9 are given the same referential codes as those given in FIG. 9 to avoid the repetition of the same descriptions.

Designated by a referential code 2a is a flat plate constituting the front plate of the main frame, and designated by referential codes 2d and 2e are supporting members which support the flat plate 2a, or the front plate, of the main frame.

This embodiment is an example of a recycling method characterized in that in order to recycle the main frame, the flat plate 2a constituting the front plate of the main frame is replaced with a flat plate which is partially different in configuration from the flat plate 2a, and also that the supporting members 2d and 2e which constitute the front members, and to which the flat plate 2a is attached, are made roughly L-shaped in cross section.

Giving the front plate supporting members a roughly L-shaped cross section improves the strength of the supporting members, making it possible to reduce the amount of the material for the supporting members while relying more on the supporting members, for the main frame strength.

Although this embodiment is described with reference to the front member of the main frame, it is not intended to limit the scope of the present invention to the front member of the main frame. In other words, replacing the original components of the main frame other than the front member of the main frame, instead of, or as well as, the front member of the main frame, with components, which are partially different in configuration from the originals, is not discordant with the gist of the present invention.

(Embodiment 8)

Figure 12:
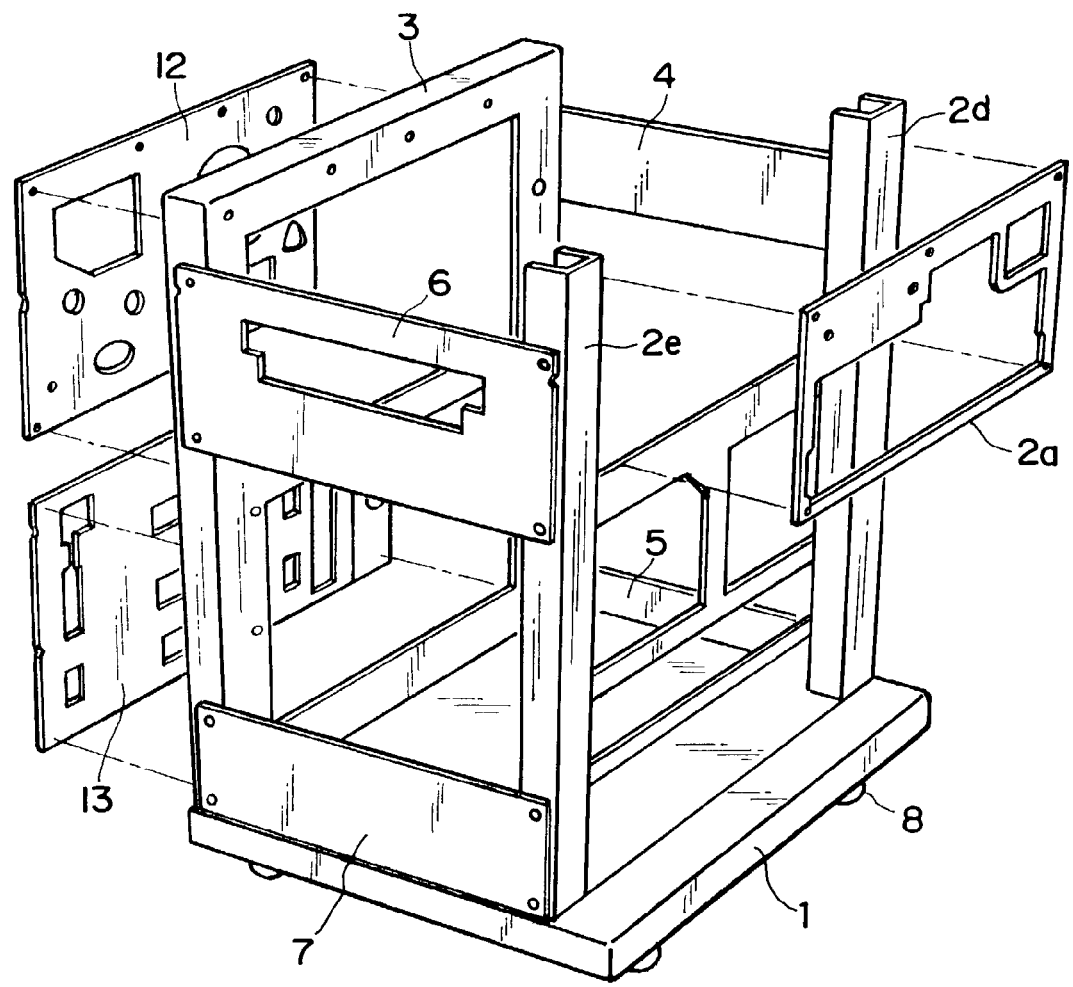
FIG. 12 is a drawing for showing the eighth embodiment of the present invention.

FIG. 12 is a drawing which best shows the characteristics of this embodiment. In the drawing, the structural components of the main frame similar to those in FIG. 11 are given the same referential codes as those given in FIG. 11 to avoid the repetition of the same descriptions.

This embodiment is an example of a recycling method characterized in that in order to recycle the main frame, the flat plate 2a constituting the front plate of the main frame is replaced with a flat plate which is partially different in configuration from the flat plate 2a, and also that the supporting member 2d and 2e which constitute the front members, and to which the flat plate 2a is attached, are made roughly U-shaped in cross section.

Giving the front plate supporting members a roughly U-shaped cross section improves the strength of the supporting members, making it possible to reduce the amount of the material for the supporting members while relying more on the supporting members, for the strength of the main frame.

Although this embodiment is described with reference to the front member of the main frame, it is not intended to limit the scope of the present invention to the front member of the main frame. In other words, replacing the original components of the main frame other than the original front member of the main frame, instead of, or as well as, the original front member of the main frame with components which are partially different in configuration from the originals, is not discordant with the gist of the present invention.

(Embodiment 9)

Figure 13:
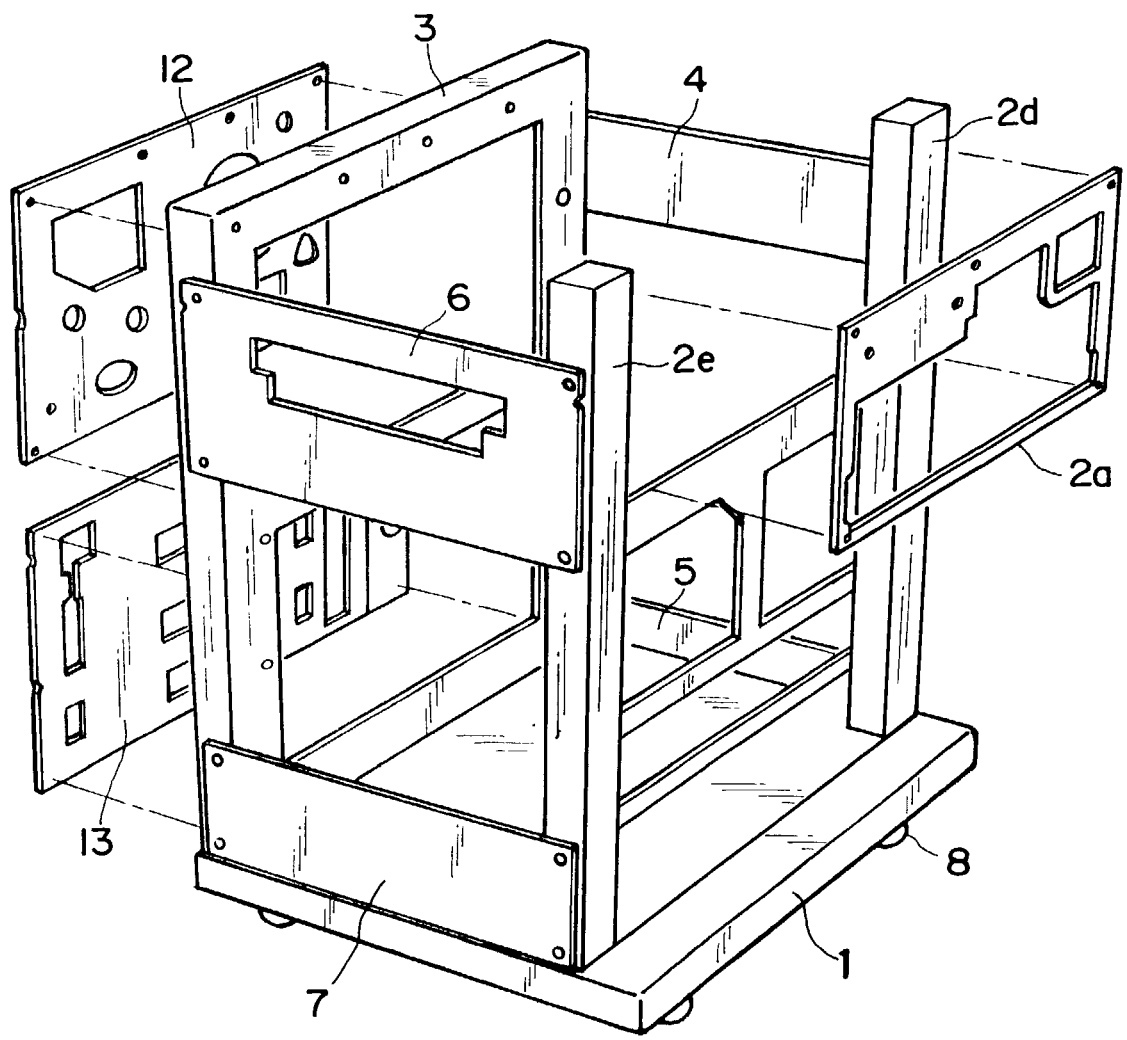
FIG. 13 is a drawing for showing the ninth embodiment of the present invention.

FIG. 13 is a drawing which best shows the characteristics of this embodiment. In the drawing, the structural components of the main frame similar to those in FIG. 11 are given the same referential codes as those given in FIG. 11 to avoid the repetition of the same descriptions.

This embodiment is an example of a recycling method characterized in that in order to recycle the main frame, the flat plate 2a constituting the front plate of the main frame is replaced with a flat plate which is partially different in configuration from the flat plate 2a, and also that the supporting members 2d and 2e which constitute the front members, and to which the flat plate 2a is attached, are made hollow, and roughly square in cross section.

Making the front plate supporting members hollow, and roughly square in cross section, improves the strength of the supporting members, making it possible to reduce the amount of the material for the supporting members while relying more on the supporting members, for the main frame strength.

As is evident from the above descriptions of the seventh–ninth embodiments, bending the front plate supporting members of the main frame at a single or plurality of lines parallel to the lengthwise direction of the supporting members, so that the cross sections of the supporting members have at least one corner, increases the strength of the supporting members. For example, in the case of the L-shaped cross section, the cross sections of the supporting members have one corner, and in the case of the U-shaped cross section, they have two corners. In the case of the supporting members which are hollow and have the square cross section, they have four corners.

Although this embodiment is described with reference to the front member of the main frame, it is not intended to limit the scope of the present invention to the front member of the main frame. In other words, the components of the main frame, which are bent as described above, may be those other than the front member of the main frame, instead of, or as well as, the front member of the main frame, and this is not discordant with the gist of the present invention.

Figure 14:
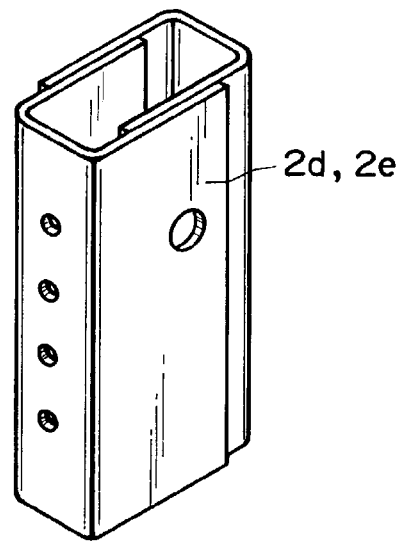
FIG. 14 is a drawing for showing the configuration of the supporting member.

As for one of the configurations for the hollow supporting members 2d and 2e in this embodiment, it may be the configuration shown in FIG. 14, which is disclosed in Japanese Laid-open Patent Application 7-271131, or the like configurations.

Figure 22:
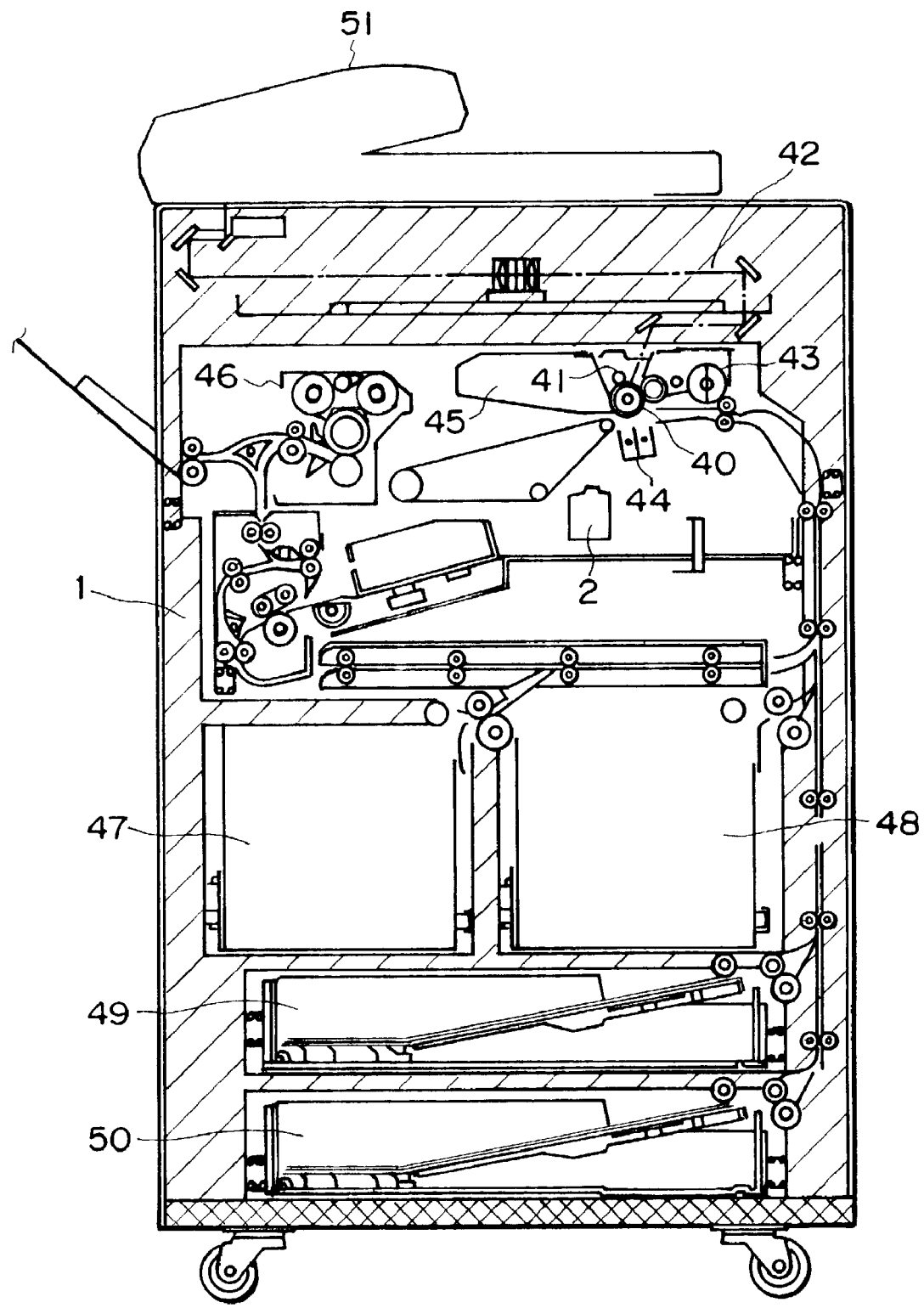
FIG. 22 is a sectional view of another example of an image forming apparatus.

FIG. 22 shows an example of an image forming apparatus compatible with the above described recycling methods. The image from an original delivered to the reading portion from the original feeding apparatus 51 is read by the reading/exposing apparatus 42, and is projected onto the peripheral surface of the photoconductive drum 40 having been charged by the charging means 41, forming an electrostatic latent image. The latent image is developed into a toner image, by the developing means 43. The toner image is transferred by the transferring means 44 onto the transfer medium delivered from one of cassettes 47, 48, 49, and 50. The transferred toner image is fixed to the transfer medium by the fixing means 46. The transfer residual toner particles, that is, the toner particles remaining on the peripheral surface of the photoconductive drum 40 after the toner image transfer, are recovered by the cleaning means 45. The recovered transfer residual toner particles are conveyed to the waste toner container 2 by the unshown waste toner conveying means, and collected therein. The above described various means of this image forming apparatus are supported by the main frame 1 of the image forming apparatus.

(Embodiment 10)

Figure 15:
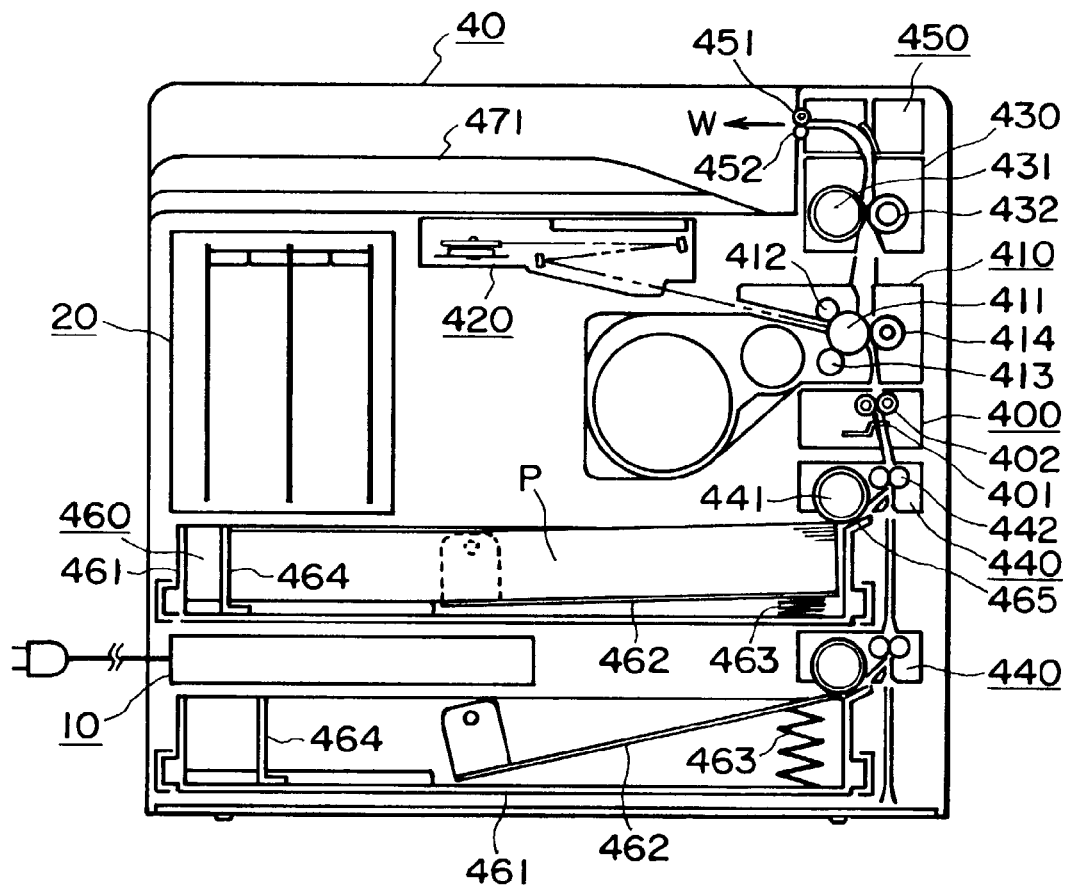
FIG. 15 is a sectional view of the image forming apparatus in the tenth embodiment of the present invention.

FIG. 15 is a vertical sectional view of an image forming apparatus, at a plane parallel to the front surface thereof, manufactured in accordance with the present invention. This image forming apparatus is an electrophotographic laser beam printer.

(1) General Structure of Image Forming Apparatus

In FIG. 15, a referential code 40 stands for the main assembly of the electrophotographic image forming apparatus for forming an image on an image recording medium in the form of a sheet. The main assembly contains the following functional devices and units; some of them may be externally held by the main assembly.

1) Power source unit 10 for supplying the various portions of the apparatus with electricity;
2) Control unit 20 for electrically controlling the various portions of the apparatus, for storing image formation data, and for processing image formation data;
3) Photoconductive drum holding toner cartridge unit 410 which contains a cylindrical photoconductive drum, the peripheral surface of which changes in potential level as it is exposed to light, and a transfer roller for transferring a toner image onto the recording medium, in addition to the toner which visualizes picture elements by adhering to the exposed portions of the peripheral surface of the photoconductive member;
4) Laser beam scanner unit 420 for scanning the peripheral surface of the photoconductive drum with a beam of laser light modulated with the image formation data;
5) Paper cassette 460, in the form of a box, for holding in layers a plurality of recording papers P as recording mediums;
6) Sheet feeding unit 440 for conveying the recording papers P from the paper cassette 460 while separating them one by one;
7) Registration roller unit 400 for positioning the leading edge of each recording paper P with reference to the toner image before transferring the toner image onto the recording paper P;
8) Fixing unit 430 for fixing the toner image having been transferred onto the recording paper P, to the recording paper P with the application of heat and pressure;
9) Sheet discharging unit 450 for discharging the recording paper P with the fixed toner image, out of the apparatus main assembly; and
    the like devices and/or units.

The image forming apparatus may be connected to a means which enables the image forming apparatus to receive image formation data from external apparatuses, a means which generates image formation data by reading an original, or the like means, so that the image forming apparatus is enabled to obtain image formation data and process them. These means may be integral parts of the image forming apparatus.

The paper cassette 460 comprises: a paper box 460; a holding plate 462 for holding the recording papers P in layers; a spring 463 for keeping the holding plate 462 pressed upward in order to keep the recording papers P on the holding plate 462 pressed upward; a trailing edge regulating plate 464 for regulating the position of the trailing edge, in terms of the recording paper conveyance direction, of the recording paper P; an unshown lateral edge regulating plate for regulating the position of the recording paper P in terms of the direction perpendicular to the recording paper conveyance direction; and the like. Further, the paper cassette 460 is structured so that it can be pulled out of the apparatus main assembly when replenishing the image forming apparatus with recording papers P, or in the like situations, and so that the lateral edge regulating plate (unshown) and the trailing edge regulating plate 464 can be moved according to the recording paper size.

The sheet feeding unit 440 of the paper cassette 460 is provided with a separating pad 465, a sheet feeding roller 441, and a conveying roller pair 442. The separating pad 465 has a high coefficient of friction. The sheet feeding roller 441 separates the topmost recording paper P in the paper box 460 from the rest of the recording papers in the paper box 460, in coordination with the separating pad 465, and feeds the recording paper P into the apparatus main assembly. The conveying roller pair 442 conveys the recording paper P toward the image forming portion of the apparatus main assembly, as the recording paper P is delivered to the conveying roller pair 442. The sheet feeding unit 440 is also provided with a recording paper detecting means for detecting whether or not a recording paper P is present on the recording paper holding plate 462, a recording paper size detecting means for detecting the size of the recording papers P in the paper box 460 and providing the apparatus main assembly with the detected recording paper size, and the like means.

The registration roller unit 400 is provided with a recording paper leading edge detection sensor 401 and a registration roller pair 402. The recording paper leading edge detection sensor 401 detects the leading and trailing edges of the recording paper P as the recording paper P is passed by the sensor 401 one by one from the sheet feeding unit 440 of the paper cassette after being separated from the rest of the recording papers P in the paper box 460. The registration roller pair 401 positions the recording paper P so that the leading edge of the recording paper P becomes perpendicular to the recording paper conveyance direction, and then, conveys the recording paper P to the image forming portion, in coordination with the timing with which the trailing end of the preceding recording paper P was detected by the recording paper leading edge detection sensor 401.

In an image forming operation, the following processes occur in the toner cartridge unit 410 integrally comprising the photoconductive drum 411. First the peripheral surface of the photoconductive drum 411, as an electrostatic latent image bearing member, is uniformly charged by the charging member 412. Then, the charged peripheral surface of the photoconductive drum 411 is exposed to a scanning beam of laser light emitted from the laser beam scanner unit 420 while being modulated with the image formation data. As a result, an electrostatic latent image is formed on the photoconductive drum 411. Next, the toner as developer is adhered to the electrostatic latent image on the photoconductive drum 411 by the development sleeve 113 as a developer bearing member. As a result, a toner image is formed on the photoconductive drum 411. As the toner image is formed, a recording paper P is passed through the contact area between the peripheral surfaces of the photoconductive drum 411 and a transfer roller 414 while being pinched by the photoconductive drum 411 and transfer roller 414. While the recording paper P is passed through the contact area, the toner image is transferred onto the surface of the recording paper P in contact with the photoconductive drum 411. Thereafter, the recording paper P is conveyed toward the fixing unit 430.

In the fixing unit 430, heat and pressure is applied to the toner on the recording paper P by the pressure roller 432 and fixing roller 431 containing a heater, as the recording paper P is passed between the two rollers. As a result, the toner image is fixed to the recording paper P.

The sheet discharging unit 450 is provided with a discharge roller 451 for discharging the recording paper P with the fixed image, out of the apparatus main assembly, and a sheet discharge roller 452 which is rotated by the rotation of the discharge roller 451. Thus, the recording paper P, to which the toner image was fixed in the fixing unit 430, is discharged into the recording paper accumulating tray 47 (delivery tray) by the discharge rollers 451 and 452.

The delivery tray 471 is located on top of the image forming apparatus main assembly 40. Therefore, a recording paper P begins to be conveyed upward from the sheet feeding portion of the paper cassette 460 located in the bottom portion of the apparatus main assembly. Then, after an image is formed thereon, the recording paper P is discharged upward. The direction indicated in FIG. 15 by an arrow mark W is the direction in which a recording paper P is discharged into the delivery tray 471.

Although not shown, the fixing unit 430, and the sheet discharging unit 450 on the downstream side of the fixing unit 430, are each provided with a detecting means for detecting whether or not the leading and trailing ends of a recording paper P will have passed within a predetermined length of time.

(2) Unit Supporting Structure

Figure 16:
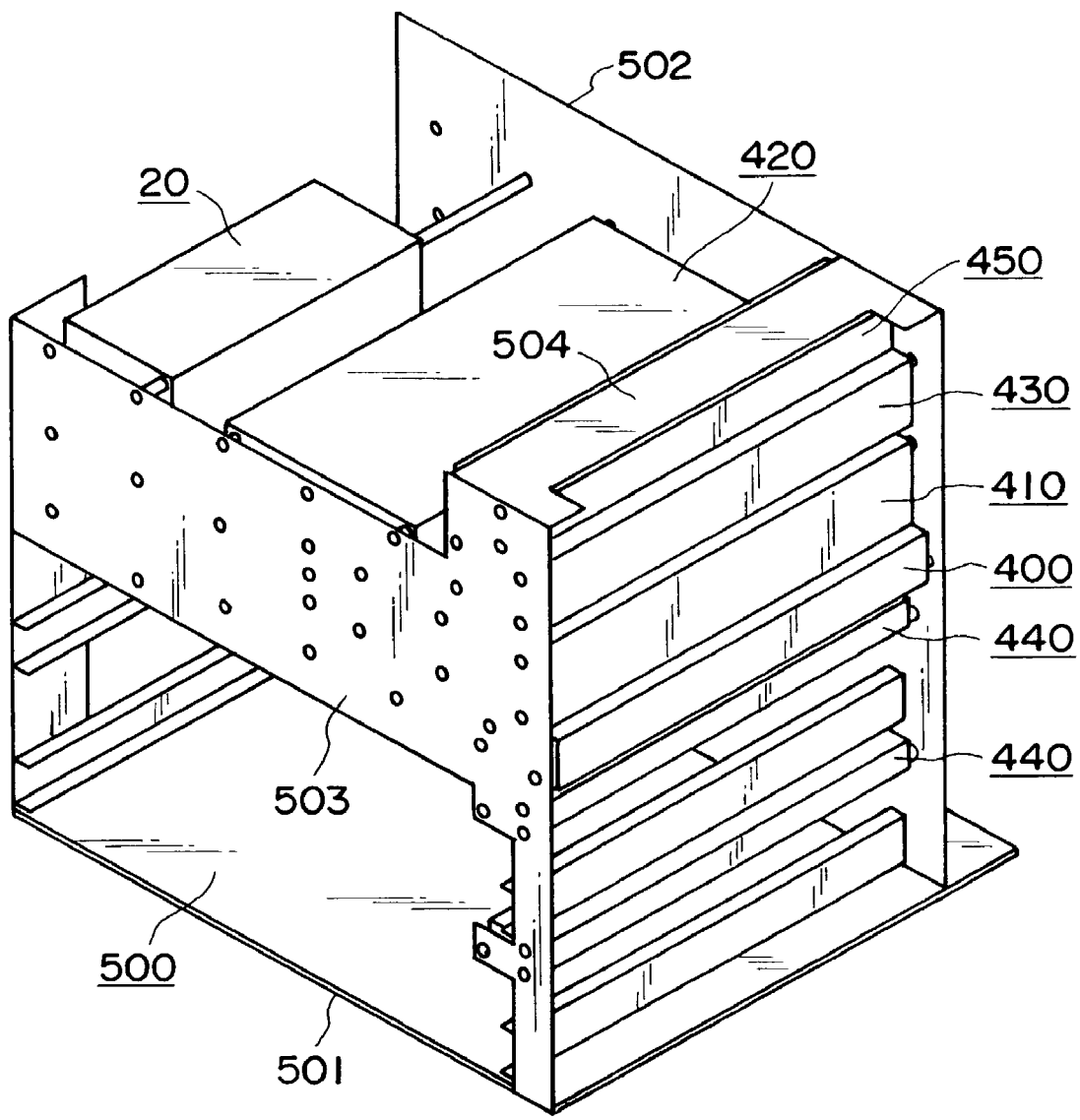
FIG. 16 is a perspective view of the image forming apparatus in FIG. 15, from which the exterior panels were removed.
Figure 17:
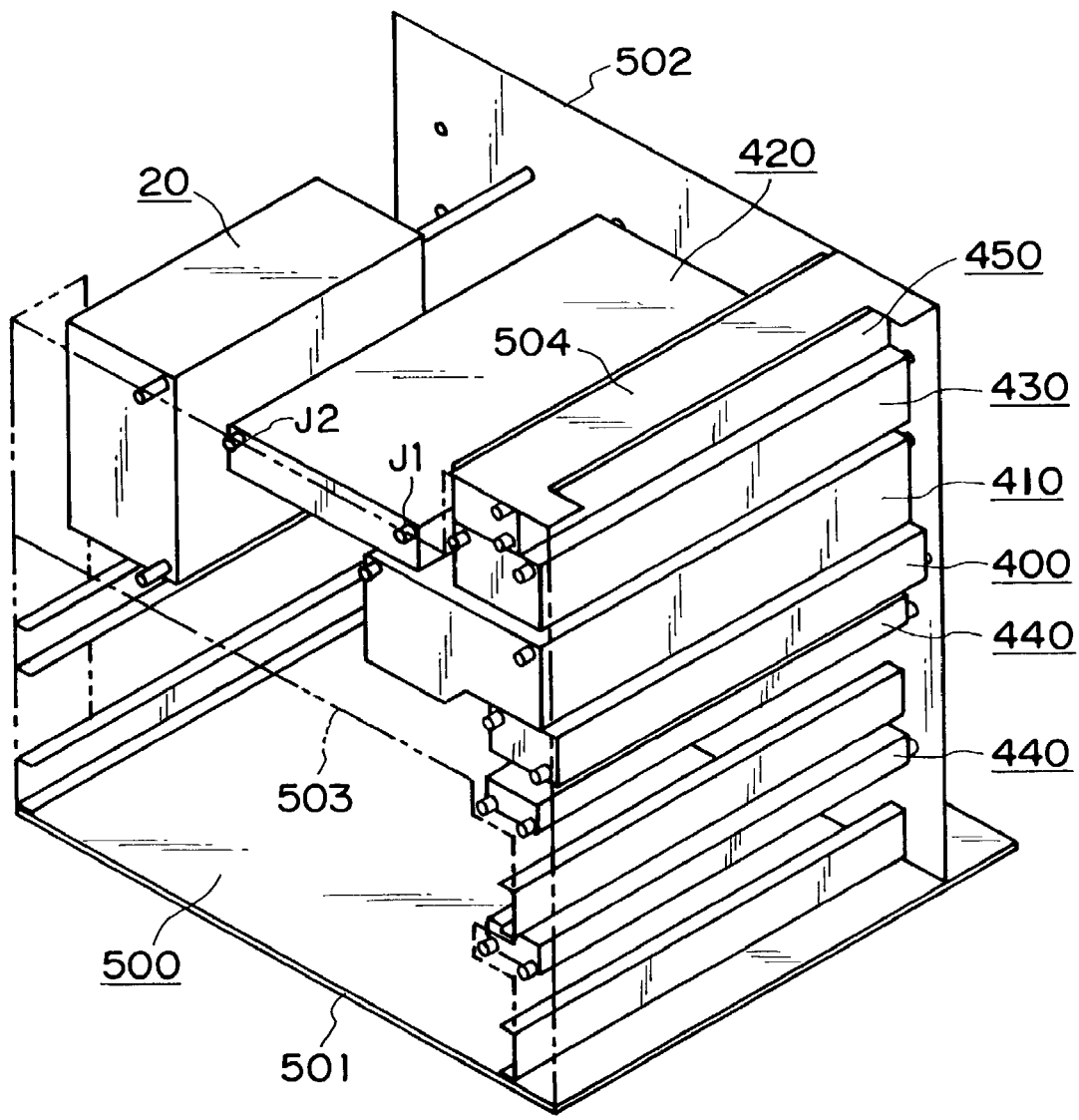
FIG. 17 is a perspective view of the image forming apparatus, from which the exterior panels were removed, and the front panel of the main frame of which is outlined by double-dot chain lines in order to give the impression that the front plate is transparent.
Figure 18:
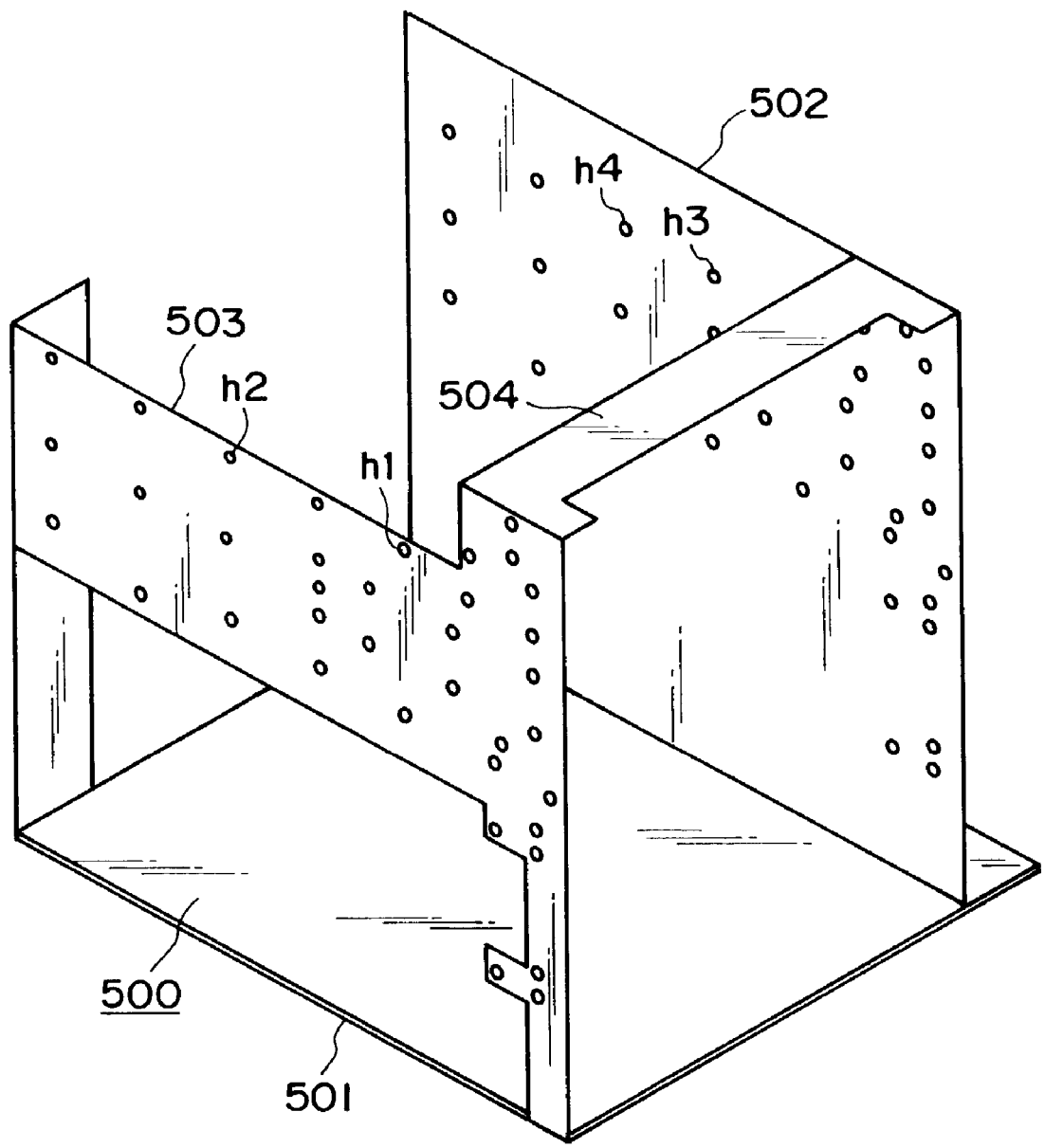
FIG. 18 is a perspective view of only the main frame of the image forming apparatus in FIG. 15.

FIG. 16 is a perspective view of an image forming apparatus in FIG. 15, from which exterior panels have been removed. FIG. 17 is a perspective view of the image forming apparatus in FIG. 16, the front plate of which is outlined in the double-dot chain line, giving the impression that the front plate was made transparent to show the components behind the front plate. FIG. 18 is a perspective view of only the main frame of the image forming apparatus in FIGS. 15 and 16.

A referential code 500 stands for the main frame of the image forming apparatus, and a referential code 501 stands for the bottom plate of the main frame 500. A referential code 502 stands for the rear plate perpendicular to the bottom plate 501, and a referential code 503 stands for the front plate which is parallel to the rear plate 502 and is perpendicular to the bottom plate 501. There is a predetermined distance between the rear and front plates 502 and 503, A referential code 504 stands for the horizontal stay which is located at the top of the main frame and connects the front and rear plates 503 and 502.

The main frame 500 is a skeletal frame comprising at least the above described plates 501–503 and stay 504, which are formed as integral parts of the main frame, or discrete parts assembled to form the main frame. This skeletal frame is referred to as the main frame. Various units which constitute the internal organs of an image forming apparatus, and the exterior panels, are attached to this main frame to realize an image forming apparatus as a merchandise.

The rear and front plates 502 and 503 of the main frame 500 are each provided with a plurality of holes. The holes of the former correspond in position to those of the latter, one for one. The shafts extended from, or put through, the above described units are put through these holes to support the units by the rear and front plates 502 and 503, in the predetermined positions between the rear and front plates 502 and 503.

For example, referring to FIG. 17, the laser beam scanner unit 420 is provided with shafts J1 and J2 as mounting/supporting members which perpendicularly extend from the lengthwise end surface of the unit 420 on the front side (perpendicular to the front plate 503); although not shown, a plurality of shafts similar to the shafts J1 and J2 perpendicularly extend from the lengthwise end surface of the unit 420 on the rear side (perpendicular to the rear plate 502). These shafts are put through the holes h1 and h2 of the front plate 503, and the holes h3 and h4 of the rear plate 502. As a result, the laser beam scanner unit 420 is supported in the predetermined position in the main frame 500.

With the provision of the structural arrangements similar to that for the laser beam scanner unit 420, the control unit 20, registration roller unit 400, photoconductive drum holding toner cartridge unit 410, fixing unit 430, paper feeding unit 440, paper discharging unit 450, and the like are supported in the predetermined positions in the main frame 500.

(3) Reuse of Apparatus Main Frame

Recovered used image forming apparatuses are disassembled into the individual components, units, and the like, to be reused to manufacture new image forming apparatuses. In the case of this embodiment of the present invention, the apparatus frames 500 are reused to manufacture "new" image forming apparatuses. Referring to FIG. 18, the main frame 500 is one of the main frames obtained by disassembling the recovered used image forming apparatuses. In this main frame 500, a plurality of the aforementioned functional units capable of performing, one for one, various functions necessary to form an image on a recording medium, are supported in the predetermined positions in the main frame 500, along with the device other than the aforementioned units. Then, these units and devices are wired, and the exterior panels are attached to the main frame 500, completing an image forming apparatus as "new" merchandise.

When originally manufacturing the main frame 500, the pair of opposing lateral plates 502 and 503 of the main frame 500 are provided with a greater number of unit supporting holes than the minimum number of unit supporting holes necessary for supporting the plurality of functional units of an image forming apparatus in accordance with an original specification (first specification), to make it easier to replace at least one of the plurality of units attached to the recycled main frame 500, with a unit different from the original unit, to place at least one of the plurality of units in the position different from the original one, to add a single or plurality of units different from the original ones, to add components to the original units, or to perform the like modification, when reusing the main frame 500 to manufacture an image forming in accordance with a specification (second specification) different from the first specification.

Figure 19:
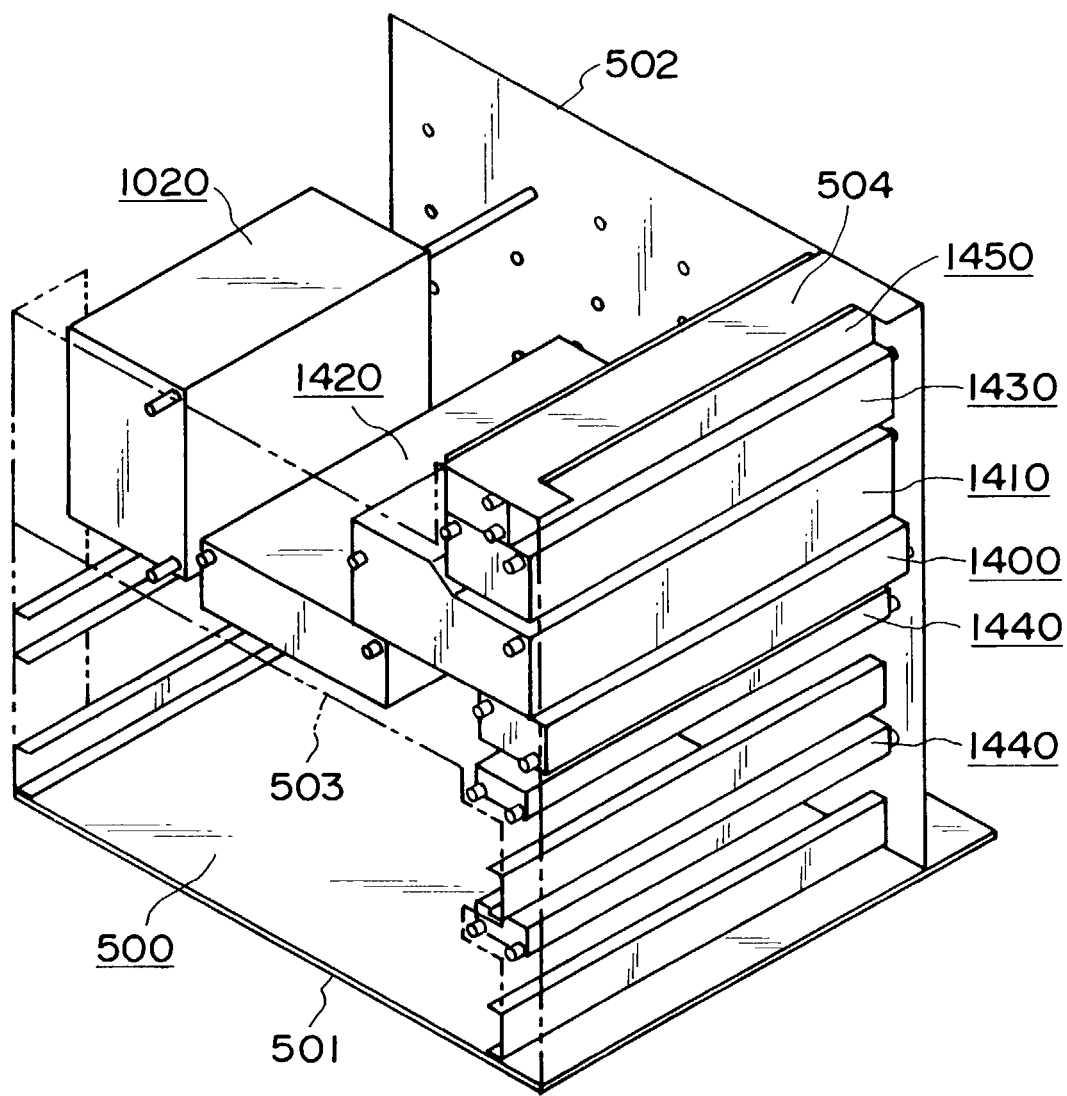
FIG. 19 is a perspective view of the main frame recycled from the image forming apparatus in FIG. 15, and the functional units which are different in configuration and/or positioning from those in the image forming apparatus in FIG. 15.

FIG. 19 shows an example of the reuse of the main frame 500. In this case, an image forming apparatus in accordance with the second specification is realized by placing a plurality of functional units, some of which are different from the counterparts in a recovered used image forming apparatus, that is, an image forming apparatus in accordance with the first specification, in the original positions, or the positions different from the original positions. In FIG. 19, the front panel 503 is outlined with double-dot chain lines, as shown in FIG. 17, giving the impression that the front panel 503 is made transparent to show the units behind the front panel 503.

In FIG. 19, a referential code 1020 stands for a control unit B different from the control unit 20, and a referential code 1400 stands for a registration roller unit B different from the registration roller unit 400. A referential code 1410 stands for a photoconductive drum holding toner cartridge unit B different from the photoconductive drum holding toner cartridge unit 410, and referential code 1420 stands for a laser beam scanner unit B different from the laser beam scanner unit 420. A referential code 1430 stands for a fixing unit B different from the fixing unit 430, and a referential code 1440 stands for a sheet feeding unit B different from the sheet feeding unit 440. A referential code 1450 stands for a sheet discharging unit B different from the sheet discharging unit 450.

Further, the laser beam scanner unit B1420 is placed in a position different from that of the laser beam scanner unit 420, in the main frame 500, being supported by the holes of the rear plate 502, different from the holes h1 and h2 of the rear plate 502, and the holes of the front plate 503, different from the holes h3 and h4 of the front plate 503.

It should be noted here that all the new units attached to the main frame recycled from the recovered image forming apparatus in accordance with the first specification to manufacture an image forming apparatus in accordance with the second specification, do not need to be different in specification and/or positioning from the original units which were attached to the main frame when the main frame belonged to an image forming apparatus in accordance with the first specification, and that the new units different in specification and/or positioning from the original units and the new units identical in specification and/or positioning to the original units may be attached in an appropriate combination to the main frame recycled from the recovered image forming apparatus.

Figure 20:
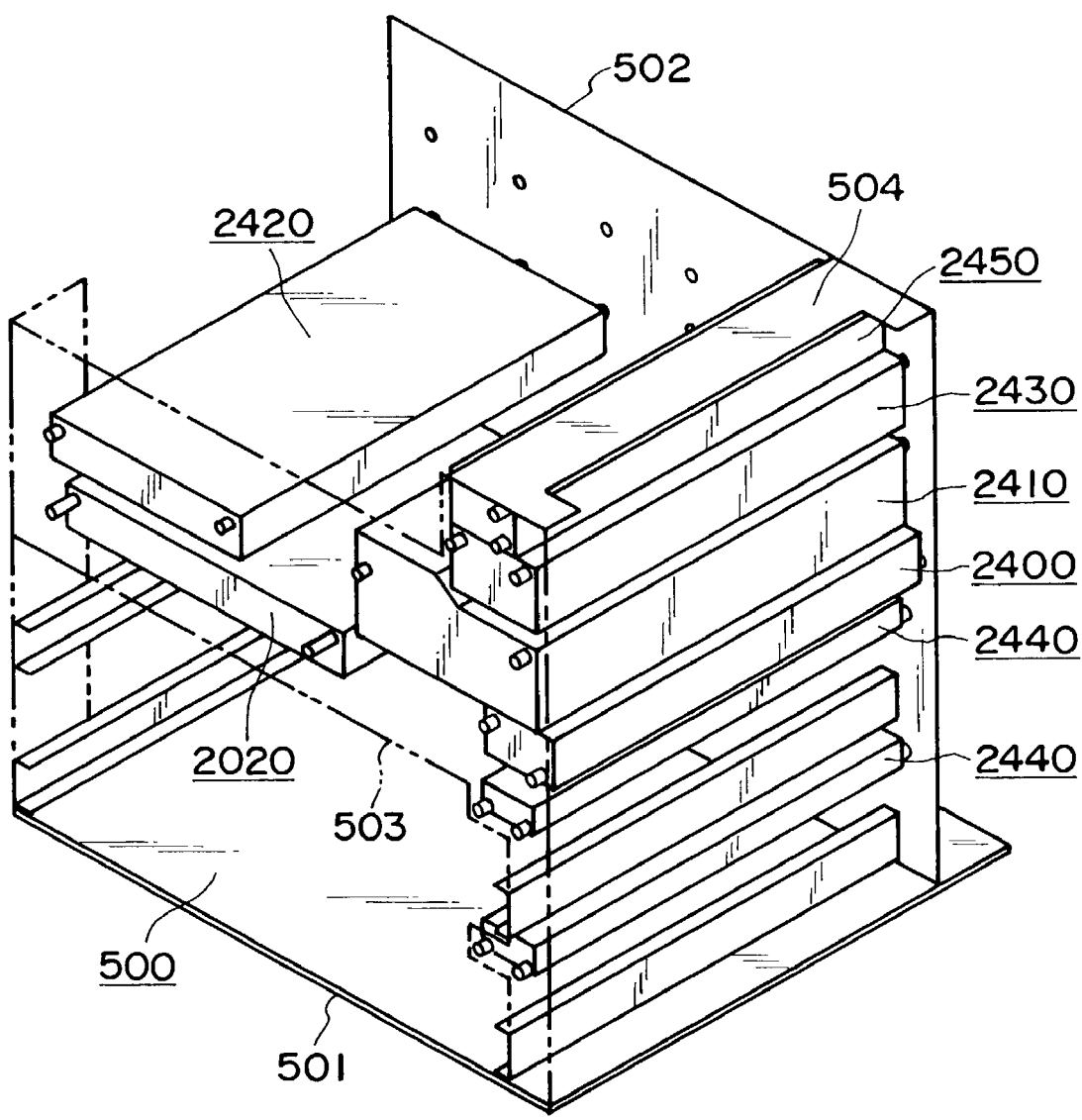
FIG. 20 is a perspective view of the main frame recycled from the image forming apparatus in FIG. 15, and the functional units different in configuration and/or positioning from those in FIGS. 15 and 19.

FIG. 20 shows another example of the reuse of the main frame 500. In this case, in order to manufacture an image forming apparatus in accordance with the second specification using the main frame recycled from a recovered used image forming apparatus in accordance with the first specification, a minimum of one of the new units attached to the main frame 500 recycled from the recovered used image forming apparatus is made different in specification and/or positioning from the corresponding unit among the original units which were attached to the recycled main frame 500, or a single or plurality of new units and/or components different from any of the original units and/or components are added to the list of the new units and/or components attached to the recycled main frame 500 to manufacture an image forming apparatus in accordance with the second specification.

In FIG. 20, a referential code 2020 stands for a control unit C different from the control units 20 and B1020, and a referential code 2400 stands for a registration roller unit C different from the registration roller units 400 and B1400. A referential code 2410 stands for a photoconductive drum holding toner cartridge unit C different from the photoconductive drum holding toner cartridges 410 and B1410, and referential code 2420 stands for a laser beam scanner unit C different from the laser beam scanner units 420 and B1420. A referential code 2430 stands for a fixing unit C different from the fixing units 430 and B1430, and a referential code 2440 stands for a sheet feeding unit C different from the sheet feeding units 440 and B1440. A referential code 2450 stands for a sheet discharging unit C different from the sheet discharging units 450 and B1450.

For example, the laser beam scanner unit 2420 is placed in the position different from those of the laser beam scanner units 420 and B1420, in the main frame 500.

It should be noted here that all the new units attached to the main frame recycled from the recovered image forming apparatus in accordance with the first specification to manufacture an image forming apparatus in accordance with the second specification, do not need to be different in specification and/or positioning from the original units which were attached to the main frame when the main frame belonged to an image forming apparatus in accordance with the first specification, and that the new units different in specification and/or positioning from the original units and the new units identical in specification and/or positioning to the original units may be attached in an appropriate combination to the main frame recycled from the recovered image forming apparatus.

Figure 21:
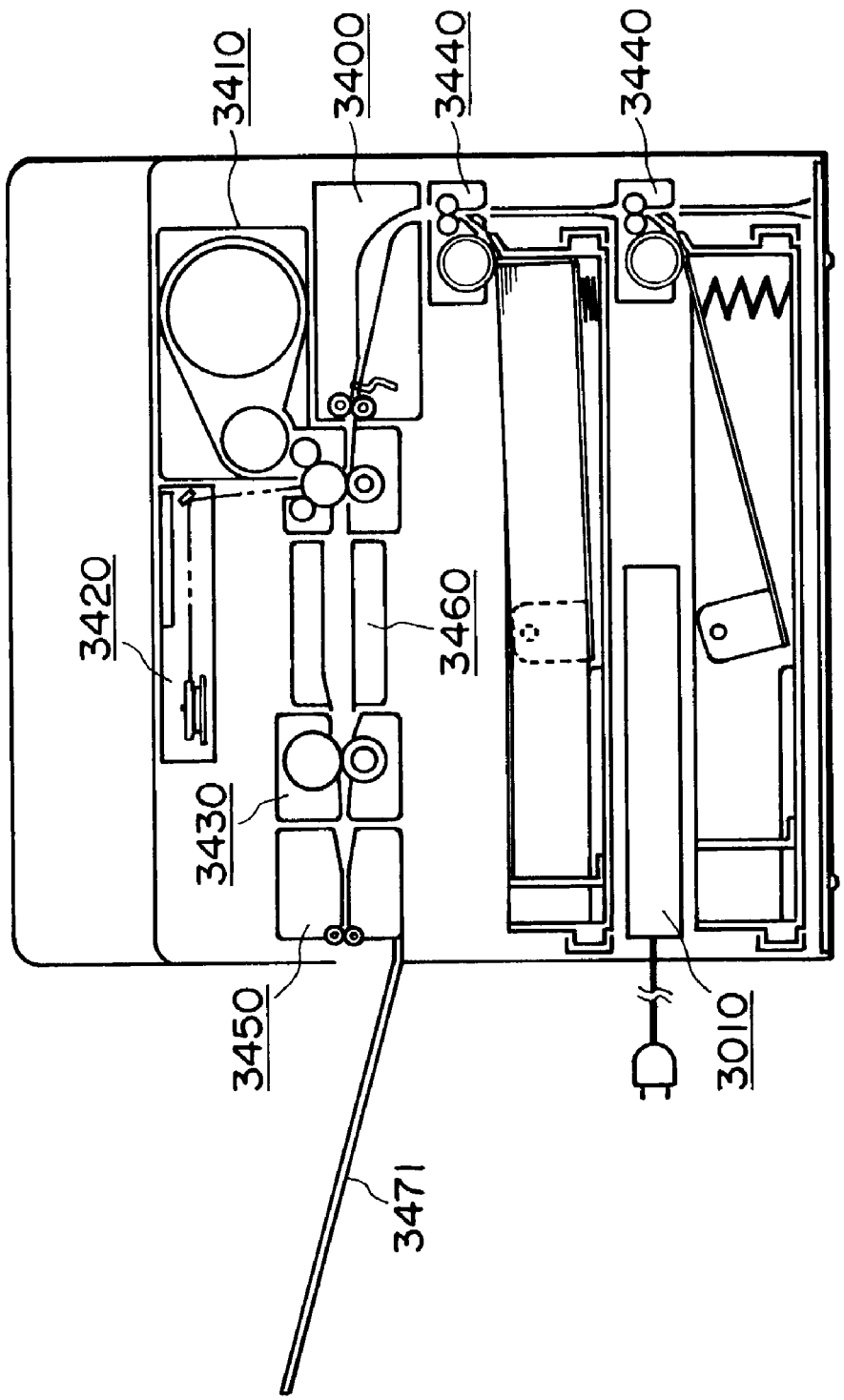
FIG. 21 is a sectional view of an image forming apparatus comprising the main frame recycled from the image forming apparatus in FIG. 15, and the functional units different in configuration and/or positioning.

FIG. 21 shows an image forming apparatus realized by attaching new units different in specification and/or positioning from those in the image forming apparatuses in FIGS. 15, 19, and 20 to the main frame recycled from the recovered used image forming apparatus. This image forming apparatus is substantially different in the paper conveyance path from the image forming apparatus in FIG. 15. In order to clarify the difference, FIG. 21, a vertical sectional view of the image forming apparatus, shows the positional relationship among the functional units, in terms of the vertical direction of the image forming apparatus. In the drawing, the main frame is not shown.

In FIG. 21, a referential code 3400 stands for a registration roller unit D different from the registration roller units 400, B1400, and C2400. A referential code 3410 stands for a photoconductive drum holding toner cartridge unit D different from the photoconductive drum holding toner cartridge units 410, B1410, and C2410, and referential code 3420 stands for a laser beam scanner unit D different from the laser beam scanner units 420, B1420, and C2420. A referential code 3430 stands for a fixing unit D different from the fixing units 430, B1430, and C2430, and a referential code 3440 stands for a sheet feeding unit D different from the sheet feeding units 440, B1440, and C2440. A referential code 3450 stands for a sheet discharging unit D different from the sheet discharging units 450, B1450, and C2450, and a referential code 3460 stands for an intermediary conveyer unit connecting the photoconductive drum holding toner cartridge D3410 and fixing unit 3430. A referential code 3471 stands for a delivery tray in which discharged recording papers are accumulated.

In the image forming apparatus in which functional units are disposed as shown in FIG. 21, an image is formed on the recording paper while the recording paper is virtually horizontally conveyed after it begins to be conveyed from the sheet feeding portion. After the image formation, the recording medium is further conveyed in the same direction, that is, horizontally, and is horizontally discharged from the apparatus main assembly. With the provision of this structural arrangement, the recording medium can be discharged into a lower position, with reference to the floor surface, than the position into which the recording medium is discharged from the image forming apparatus in which the functional units are disposed as shown in FIG. 15. In other words, an image forming apparatus in which the units are disposed as shown in FIG. 21 is advantageous in that it is easier for a shorter person to use.

It should be also noted here that all the new units attached to the main frame recycled from the recovered image forming apparatus in accordance with the first specification to manufacture an image forming apparatus in accordance with the second specification, do not need to be different in specification and/or positioning from the original units which were attached to the main frame when the main frame belonged to an image forming apparatus in accordance with the first specification, and that the new units different in specification and/or positioning from the original units and the new units identical in specification and/or positioning to the original units may be attached in an appropriate combination to the main frame recycled from the recovered image forming apparatus.

As is evident from the above descriptions of the embodiments of the present invention, the provision of the above described structural arrangements makes it easier to replace a single or plurality of the original units with a single or plurality of units different from the original unit to modify the image forming apparatus. For example, the original control unit can be easily replaced to increase processing speed; the original laser beam scanner unit can be easily replaced to increase resolution; the original sheet feeding unit can be easily replaced to improve paper separation performance; and/or the original fixing unit can be easily replaced to reduce power consumption.

Further, the provision of the above described structural arrangements makes it possible not only to replace a single or plurality of current units with a single or plurality of units different in function, performance, and/or positioning from the current units, or to rearrange the current units, but also to add a single or plurality of units new in function, to manufacture an image forming apparatus different in specification from the recovered used image forming apparatus from which the main frame was recycled. For example, although the preceding embodiments of the present invention were described with reference to an image forming apparatus comprising a single photoconductive drum holding monochromatic toner cartridge unit, this monochromatic image forming apparatus can be remanufactured into a color image forming apparatus, by the addition of a plurality of photoconductive drum holding toner cartridge units different in toner color.

In order to realize the above described objects, the rear and front plates 502 and 503 of the apparatus main frame 500 are provided in advance with an excessive number of holes, that is, a greater number of holes than the minimum number of holes necessary for the manufacture of the image forming apparatus in FIG. 15, so that the rear and front plate 502 and 503 are made compatible even with units different in specification and/or positioning from those in the image forming apparatus in FIG. 15.

While the invention has been described with reference to the structures disclosed herein, it is not confined to the details set forth, and this application is intended to cover such modifications or changes as may come within the purposes of the improvements or the scope of the following claims.

What is claimed is:

1. A recycling method for recycling an apparatus of a first type into an apparatus of a second type, said method comprising the steps of:
    removing a first type of part from a supporting portion of a supporting member; and
    mounting a second type of part to another supporting portion of the supporting member which is different from the supporting portion from which the first type of part has been removed in said removing steps,
    wherein the supporting member has a number of such supporting portions, the number exceeding a number of the supporting portions for the first type of part or a number of the supporting portions for the second type of part.

2. A method according to claim 1, wherein the second type of part having a different specification is mounted to a position at which the first type of part has been mounted.

3. A method according to claim 1, wherein the second type of part is mounted to a position different from a position at which the first type of part is mounted.

4. A method according to claim 1, wherein the first and second types of parts have respective engaging portions for engagement with respective ones of the supporting portions, and the supporting portions have respective hole portions for engagement with the respective engaging portions.

5. A method according to claim 4, wherein the engaging portions are provided at opposite ends of the first and second types of parts supported by respective ones of the supporting portions.

6. A method according to claim 5, wherein the engaging portions are provided at opposite ends of respective shaft members penetrating the corresponding first and second types of parts.

7. A method according to claim 1, wherein said apparatuses are image forming apparatuses, and supporting portions support respective units having different functions for image formation.

8. A method according to claim 1, wherein said apparatuses are image forming apparatuses, and the parts are plate-like members constituting respective side plates of said image forming apparatuses.

9. An image forming apparatuses provided by a recycling method for recycling an apparatus of a first type into an apparatus of a second type, said method comprising the steps of:
    removing a first type of part from a supporting portion of a supporting member; and
    mounting a second type of part to another supporting portion of the supporting member which is different from the supporting portion from which the first type of part has been removed in said removing step,
    wherein the supporting member has a number of such supporting portions, the number exceeding a number of the supporting portions for the first type of part or a number of the supporting portions for the second type of part.

10. An apparatus according to claim 9, wherein the second type of part having a different specification is mounted to a position at which the first type of part has been mounted.

11. An apparatus according to claim 9, wherein the second type of part is mounted to a position different from a position at which the first type of part is mounted.

12. An apparatus according to claim 9, wherein the first and second types of parts have respective engaging portions for engagement with respective ones of the supporting portions, and the supporting portions have respective hole portions for engagement with the respective engaging portions.

13. An apparatus according to claim 9, wherein the engaging portions are provided at opposite ends of the first and second types of parts supported by respective ones of the supporting portions.

14. An apparatus according to claim 13, wherein the engaging portions are provided at respective opposite ends of respective shaft members penetrating the corresponding first and second types of parts.

15. An apparatus according to claim 14, wherein said apparatuses are image forming apparatuses, and supporting members support respective units having different functions for image formation.

16. An apparatus according to claim 12, wherein said apparatuses are image forming apparatuses, and the first and second types of parts are plate-like members constituting respective side plates of said image forming apparatuses.

* * * * *

UNITED STATES PATENT AND TRADEMARK OFFICE
CERTIFICATE OF CORRECTION

| | |
|---|---|
| PATENT NO. | : 6,983,113 B2 |
| APPLICATION NO. | : 10/229234 |
| DATED | : January 3, 2006 |
| INVENTOR(S) | : Yasuyoshi Yamamoto et al. |

It is certified that error appears in the above-identified patent and that said Letters Patent is hereby corrected as shown below:

On Title Page, Col. 1
 In item "(54)," "RECYCLING METHOD USING A MODIFIED PART AND IMAGE FORMING APPARATUS MANUFACTURED USING THE RECYCLING METHOD" should read as follows:

-- RECYCLING METHOD USING PARTS OF DIFFERENT SHAPES, AND IMAGE FORMING APPARATUS MANUFACTURED USING THE RECYCLING METHOD --.

COLUMN 1:
 Lines 1-4, "RECYCLING METHOD USING A MODIFIED PART AND IMAGE FORMING APPARATUS MANUFACTURED USING THE RECYCLING METHOD" should read -- RECYCLING METHOD USING PARTS OF DIFFERENT SHAPES, AND IMAGE FORMING APPARATUS MANUFACTURED USING THE RECYCLING METHOD --.

COLUMN 12:
 Line 52, "sleeve 113" should read -- sleeve 413 --.

COLUMN 13:
 Line 9, "tray 47" should read -- tray 471 --.
 Line 44, "503," should read -- 503. --.

COLUMN 17:
 Line 54, "steps," should read -- step, --.

UNITED STATES PATENT AND TRADEMARK OFFICE
CERTIFICATE OF CORRECTION

PATENT NO. : 6,983,113 B2
APPLICATION NO. : 10/229234
DATED : January 3, 2006
INVENTOR(S) : Yasuyoshi Yamamoto et al.

It is certified that error appears in the above-identified patent and that said Letters Patent is hereby corrected as shown below:

<u>COLUMN 18:</u>
Line 22, "apparatuses" should read -- apparatus --.

Signed and Sealed this

Fourteenth Day of November, 2006

JON W. DUDAS
*Director of the United States Patent and Trademark Office*